US012379004B2

(12) United States Patent
Ono et al.

(10) Patent No.: US 12,379,004 B2
(45) Date of Patent: Aug. 5, 2025

(54) CLUTCH CONTROL DEVICE

(71) Applicant: HONDA MOTOR CO., LTD., Tokyo (JP)

(72) Inventors: Junya Ono, Tokyo (JP); Tatsuya Ryuzaki, Tokyo (JP); Ryohei Tsuzuki, Tokyo (JP); Yuma Kaibe, Tokyo (JP); Junichiro Kano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/844,062

(22) PCT Filed: Mar. 15, 2023

(86) PCT No.: PCT/JP2023/010112
§ 371 (c)(1),
(2) Date: Sep. 5, 2024

(87) PCT Pub. No.: WO2023/182104
PCT Pub. Date: Sep. 28, 2023

(65) Prior Publication Data
US 2025/0180081 A1 Jun. 5, 2025

(30) Foreign Application Priority Data
Mar. 22, 2022 (JP) ................................ 2022-045432

(51) Int. Cl.
*F16D 48/06* (2006.01)
(52) U.S. Cl.
CPC ...... *F16D 48/06* (2013.01); *F16D 2500/1117* (2013.01); *F16D 2500/7041* (2013.01); *F16D 2500/70422* (2013.01)
(58) Field of Classification Search
CPC .. F16D 48/06; F16D 48/08; F16D 2500/1117; F16D 2500/7041; F16D 2500/70422
See application file for complete search history.

(56) References Cited

U.S. PATENT DOCUMENTS

| 5,307,269 A * | 4/1994 | Kohno .................. F16D 48/066 192/82 T |
| 8,651,256 B2 * | 2/2014 | Bitzer ................... F16D 66/026 192/30 W |

(Continued)

FOREIGN PATENT DOCUMENTS

| JP | 5004915 | 8/2012 |
| JP | 2012-202472 | 10/2012 |
| WO | 2019/087512 | 5/2019 |

OTHER PUBLICATIONS

International Search Report and Written Opinion for International Application No. PCT/JP2023/010112 mailed on May 30, 2023, 8 pages.

(Continued)

*Primary Examiner* — Edwin A Young
(74) *Attorney, Agent, or Firm* — Amin, Turocy & Watson, LLP

(57) ABSTRACT

This clutch control device includes a clutch device connecting and disconnecting power transmission between a prime mover and an output target, a clutch actuator outputting a driving force for operating the clutch device, a release mechanism operating the clutch device by receiving a driving force of the clutch actuator, a control unit driving and controlling the clutch actuator, a first detection part detecting an output value of the clutch actuator, and second detection parts detecting an amount of operation of the release mechanism, in which the control unit controls an operation of the clutch actuator by selectively using detection information of the first detection part and detection information of the second detection parts.

6 Claims, 17 Drawing Sheets

(56) References Cited

U.S. PATENT DOCUMENTS

| | | | |
|---|---|---|---|
| 11,131,351 B2 | 9/2021 | Ono et al. | |
| 11,162,546 B2 | 11/2021 | Ono et al. | |
| 2014/0011633 A1* | 1/2014 | Suzuki | F16H 61/2807 477/70 |
| 2016/0024862 A1* | 1/2016 | Wilson | E21B 3/035 166/380 |
| 2019/0162253 A1 | 5/2019 | Matsuura et al. | |
| 2020/0332844 A1 | 10/2020 | Ono et al. | |

OTHER PUBLICATIONS

Extended European Search Report for European Patent Application No. 23774700.1 dated Apr. 4, 2025.

* cited by examiner

CLUTCH CONTROL DEVICE

TECHNICAL FIELD

The present invention relates to a clutch control device.

The present application claims priority based on Japanese Patent Application No. 2022-045432 filed on Mar. 22, 2022, the contents of which are incorporated herein by reference.

BACKGROUND ART

In straddle-type vehicles in recent years, an automatic clutch system configured to perform connection and disconnection operations of a clutch device automatically by electric control has been proposed (for example, see Patent Document 1).

RELATED ART DOCUMENT

Patent Document

Patent Document 1: Japanese Patent No. 5004915

SUMMARY

Problems to be Solved by the Invention

In the above-described conventional technology, the clutch device is configured to be disconnected by supplying a hydraulic pressure from a hydraulic actuator to a slave cylinder.

However, in a system that controls a clutch capacity hydraulically, while the clutch capacity can be controlled by a load, an operating position of a driven member must be estimated only by the load. Therefore, there is a problem that it is difficult to control, for example, a vicinity of a touch point (operating position at which connection starts) of the clutch device.

The present invention has been made in view of the above circumstances, and an objective of the present invention is to enable an optimal control according to a status of a clutch device in a clutch control device that controls connection and disconnection of the clutch device.

Means for Solving the Problem

As a means for solving the above-described problem, an aspect of the present invention has the following configuration.

(1) A clutch control device according to an aspect of the present invention includes a clutch device connecting and disconnecting power transmission between a prime mover and an output target, a clutch actuator outputting a driving force for operating the clutch device, a release mechanism operating the clutch device by receiving a driving force of the clutch actuator, a control unit driving and controlling the clutch actuator, a first detection part detecting an output value of the clutch actuator, and second detection parts detecting an amount of operation of the release mechanism, in which the control unit controls an operation of the clutch actuator by selectively using detection information of the first detection part and detection information of the second detection parts.

According to the clutch control device according to the above-described (1) of the present invention, a parameter used for control of the clutch device can be switched to either the output value of the clutch actuator or the amount of operation of the release mechanism according to an operation state of the clutch device. For example, in a region such as a half-clutch region in which a change in the output value of the clutch actuator is large with respect to the amount of operation of the release mechanism, the output value of the clutch actuator is used to control the operation of the clutch actuator. Also, in a region such as a clutch disconnection region in which a change in the output value of the clutch actuator is small with respect to the amount of operation of the release mechanism, the amount of operation of the release mechanism is used to control the operation of the clutch actuator. As described above, the clutch actuator can be appropriately controlled by suitably using the output value sensor and the operation amount sensor according to an operation state of the clutch device.

(2) In the clutch control device according to the above-described (1), the control unit may enable a manual operation intervention by a clutch operator during an automatic control of the clutch device due to driving of the clutch actuator and proceed to a predetermined manual operation intervention control when there has been the manual operation intervention, and the control unit may detect the manual operation intervention by referring to detection information of the first detection part and detection information of the second detection parts and perform the manual operation intervention control.

According to the clutch control device according to the above-described (2) of the present invention, a parameter detecting the manual operation intervention and used for the manual operation intervention control can be switched to either the output value of the clutch actuator or the amount of operation of the release mechanism according to an operation state of the clutch device. For example, in a region such as the half-clutch region in which a change in the output value of the clutch actuator is large with respect to the amount of operation of the release mechanism, the output value of the clutch actuator and a position of the release mechanism are used to detect the manual operation intervention and perform the manual operation intervention control. Also, in a region such as the clutch disconnection region in which a change in the output value of the clutch actuator is small with respect to the amount of operation of the release mechanism, a change in a motor load with respect to an angle (position) of the release mechanism is used to detect the manual operation intervention and perform the manual operation intervention control. Thereby, the manual operation intervention can be appropriately performed according to a state of the clutch device.

(3) In the clutch control device according to the above-described (1), the control unit may switch between a control using detection information of the first detection part and a control using detection information of the second detection parts at a clutch connection point at which power transmission is started from a disconnected state in which power transmission is not possible in the clutch device.

According to the clutch control device according to the above-described (3) of the present invention, in a region such as the half-clutch region in which a change in the output value of the clutch actuator is large with respect to the amount of operation of the release mechanism, the output value of the clutch actuator is used to control the operation of the clutch actuator. Also, in a region such as the clutch disconnection region in which a change in the output value of the clutch actuator is small with respect to the amount of operation of the release mechanism, the amount of operation of the release mechanism is used to control the operation of the clutch actuator. Thereby, the clutch actuator can be appropriately controlled according to a state of the clutch device.

(4) In the clutch control device according to the above-described (3), the control unit may check and update the clutch connection point when power is turned on or off.

According to the clutch control device according to the above-described (4) of the present invention, since the clutch connection point is checked and updated frequently, the clutch connection point is appropriately corrected even when there is an influence of an engine temperature, clutch wear, or the like. Thereby, the clutch actuator can be appropriately controlled according to a state of the clutch device.

(5) The clutch control device according to the above-described (3) or (4), May include a notification means notifying a user of the clutch control device that the clutch connection point has exceeded a predetermined threshold value, in which the control unit may operate the notification means when the clutch connection point exceeds the predetermined threshold value.

According to the clutch control device according to the above-described (5) of the present invention, when clutch wear increases or an abnormality occurs in the device, it is possible to quickly notify the user of it, thereby making it easier to maintain an appropriate control of the clutch device.

Advantage of the Invention

According to an aspect of the present invention, in a clutch control device that controls connection and disconnection of a clutch device, an optimal control can be performed according to a status of the clutch device.

DESCRIPTION OF THE EMBODIMENTS

Figure 1:
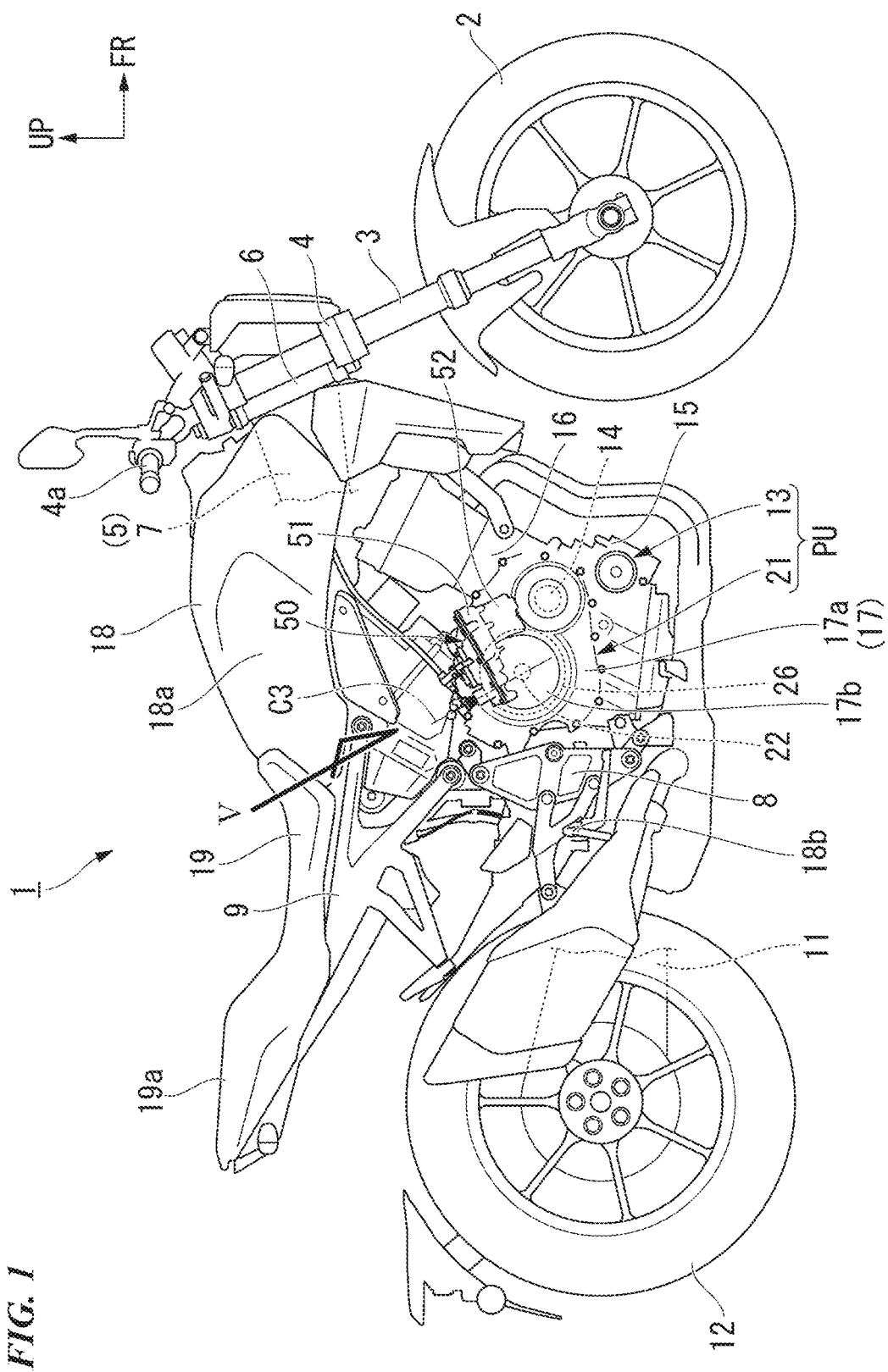
FIG. 1 is a right side view of a motorcycle of the present embodiment.

Hereinafter, an embodiment of the present invention will be described with reference to the drawings. Further, in the following description, directions such as forward, rearward, left, and right are the same as directions in a vehicle to be described below unless otherwise specified. Also, an arrow FR indicating a forward direction with respect to the vehicle, an arrow LH indicating a leftward direction with respect to the vehicle, and an arrow UP indicating an upward direction with respect to the vehicle are illustrated at suitable positions in the drawings used for the following description.

<Overall Vehicle>

As illustrated in FIG. 1, the present embodiment is applied to a motorcycle 1 as an example of a straddle-type vehicle. A front wheel 2 of the motorcycle 1 is supported by lower end portions of a pair of left and right front forks 3. Upper portions of the left and right front forks 3 are supported by a head pipe 6 at a front end portion of a vehicle body frame 5 via a steering stem 4. A bar-type steering handle 4a is mounted on a top bridge of the steering stem 4.

The body frame 5 includes a head pipe 6, a main frame 7 extending downward and rearward from the head pipe 6 through a center in a vehicle width direction (left-right direction), a pivot frame 8 provided below a rear end portion of the main frame 7, and a seat frame 9 continuous with the rear of the main frame 7 and the pivot frame 8. A front end portion of a swing arm 11 is pivotally supported by the pivot frame 8 to be swingable. A rear wheel 12 of the motorcycle 1 is supported by a rear end portion of the swing arm 11.

A fuel tank 18 is supported above the left and right main frames 7. A front seat 19 and a rear seat 19a are supported behind the fuel tank 18 and above the seat frame 9. Knee grip parts 18a recessed inward in the vehicle width direction are formed on both left and right sides of a rear portion of the fuel tank 18. The left and right knee grip parts 18a are formed to align with inner sides around the left and right knees of a driver seated on the front seat 19. Steps 18b on which the driver places his/her feet portions from ankles forward are supported on both left and right sides below the front seat 19.

A power unit PU including a prime mover of the motorcycle 1 is suspended below the main frame 7. The power unit PU integrally includes an engine (internal combustion engine, prime mover) 13 positioned on a front side thereof and a transmission 21 positioned on a rear side thereof. The engine 13 is, for example, a multi-cylinder engine in which a rotation axis of a crankshaft 14 is aligned in the left-right direction (vehicle width direction).

The engine 13 includes cylinders 16 erected above a front portion of a crankcase 15. A rear portion of the crankcase 15 is a transmission case 17 that houses the transmission 21. A right cover 17a extending over a right portion of the transmission case 17 is attached to a right portion of the crankcase 15. The right cover 17a also serves as a clutch cover that covers a clutch device 26. The power unit PU is linked to the rear wheel 12 via, for example, a chain type transmission mechanism (not illustrated).

<Transmission>

Figure 2:
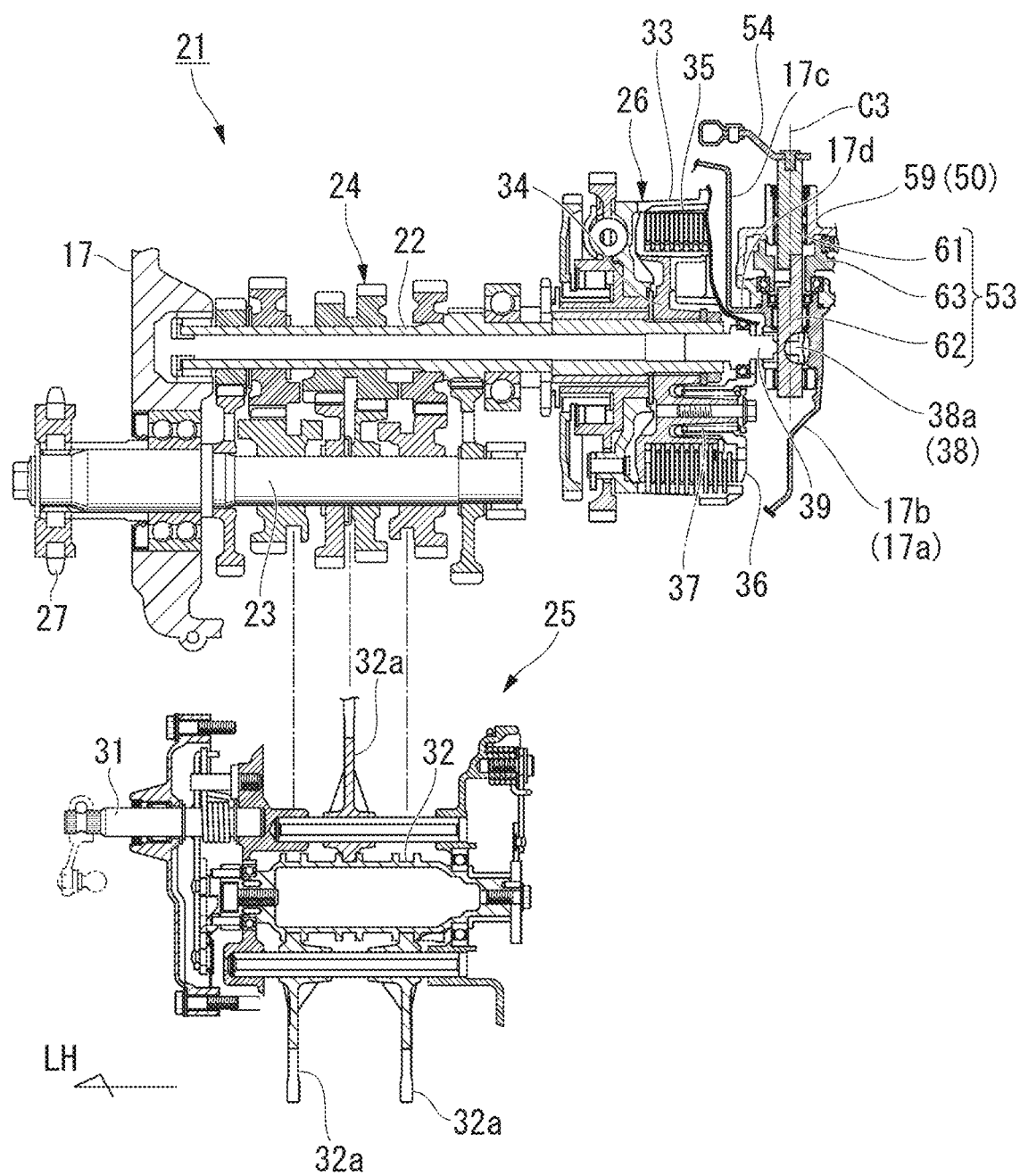
FIG. 2 is a cross-sectional view of a transmission and a change mechanism of the motorcycle.

Referring also to FIG. 2, the transmission 21 is a stepped transmission having a main shaft 22, a countershaft 23, and a transmission gear group 24 that straddles both the shafts 22 and 23. The countershaft 23 constitutes an output shaft of the transmission 21, and therefore, the power unit PU. A left end portion of the countershaft 23 protrudes to a left side of a rear portion of the transmission case 17 and is connected to the rear wheel 12 via the above-described chain type transmission mechanism.

The main shaft 22 and the countershaft 23 of the transmission 21 are disposed behind the crankshaft 14. The clutch device 26 is coaxially disposed at a right end portion of the main shaft 22. The clutch device 26 connects and disconnects power transmission between the crankshaft 14 of the engine 13 and the main shaft 22 of the transmission 21. The clutch device 26 operates to be connected or disconnected by at least one of an operation of a clutch operator (for example, a clutch lever (not illustrated)) by a rider and an operation of a clutch actuator 50 to be described in detail later.

The clutch device 26 is, for example, a wet multi-plate clutch and is a so-called normally closed clutch. Rotational power of the crankshaft 14 is transmitted to the main shaft 22 via the clutch device 26, and is transmitted from the main shaft 22 to the countershaft 23 via an arbitrary gear pair of the transmission gear group 24. A drive sprocket 27 of the above-described chain type transmission mechanism is attached to a left end portion of the countershaft 23 that protrudes to a left side of a rear portion of the crankcase 15.

A change mechanism 25 for switching gear pairs of the transmission gear group 24 is housed in the transmission case 17 in the vicinity of the transmission 21. When a hollow cylindrical shift drum 32 parallel to both the shafts 22 and 23 rotates, the change mechanism 25 operates a plurality of shift forks 32a according to a pattern of lead grooves formed on an outer circumference of the hollow cylindrical shift drum 32 to switch the gear pairs of the transmission gear group 24 used for power transmission between both the shafts 22 and 23.

Here, the motorcycle 1 employs a so-called semi-automatic transmission system (automatic clutch type transmission system) in which the driver performs only a gear shift operation (foot operation on a shift pedal (not illustrated)) of the transmission 21 and connection and disconnection operations of the clutch device 26 are automatically performed by electric control according to an operation of the above-described shift pedal.

<Transmission System>

Figure 3:
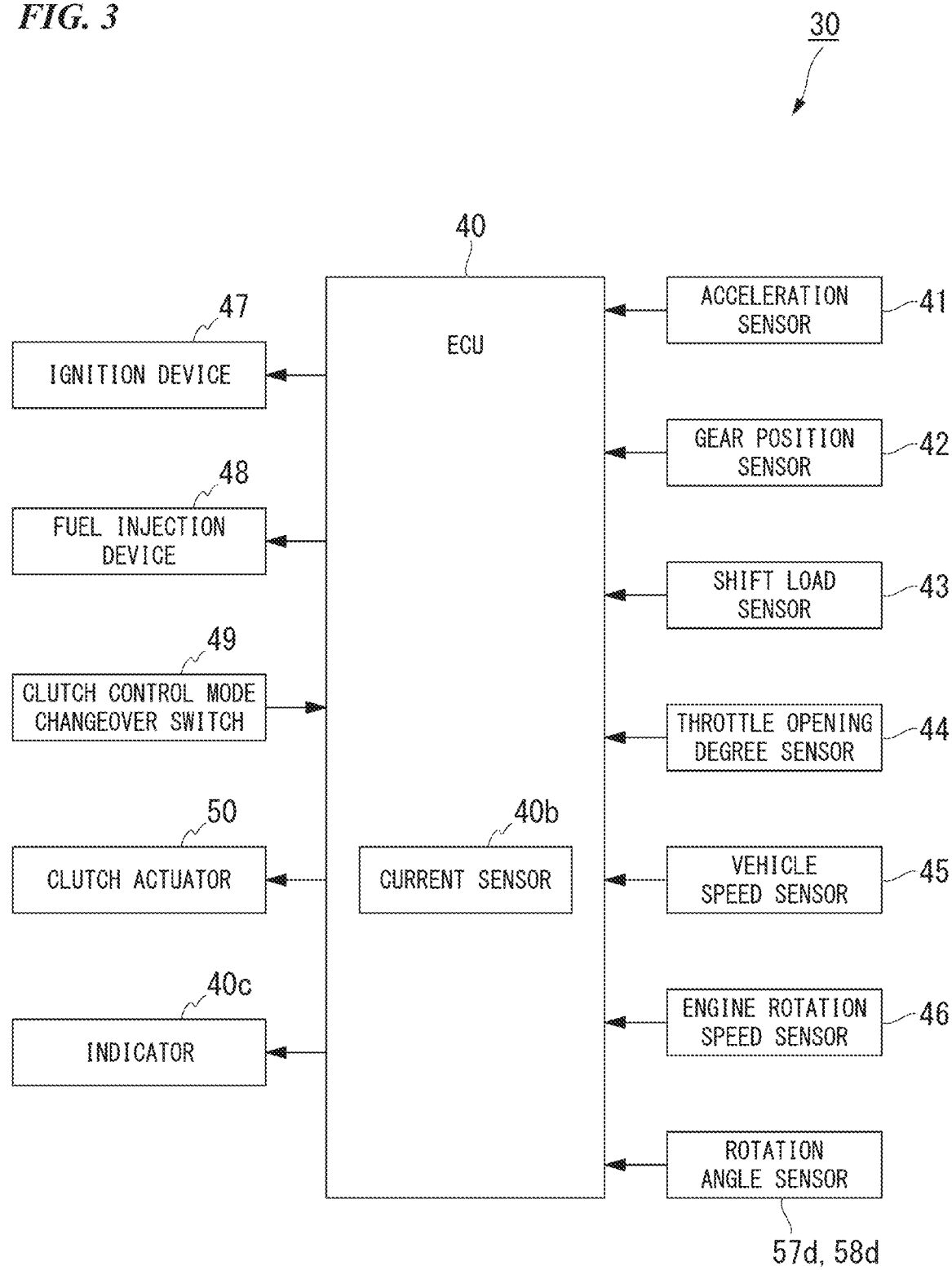
FIG. 3 is a block diagram of a transmission system of the motorcycle.

As shown in FIG. 3, the transmission system 30 includes the clutch actuator 50, an electronic control unit (ECU, control unit) 40, various types of sensors 41 to 46, 57d, and 58d, and various types of devices 47, 48, and 50.

The ECU 40 operates and controls an ignition device 47 and a fuel injection device 48 and also operates and controls the clutch actuator 50 on the basis of detection information from an acceleration sensor 41 detecting a behavior of the vehicle body, a gear position sensor 42 detecting a gear shift stage from a rotation angle of the shift drum 32, and a shift load sensor 43 (for example, a torque sensor) detecting an operating torque input to a shift spindle 31 (see FIG. 2) of the change mechanism 25, and vehicle state detection information of various types from a throttle opening degree sensor 44 detecting a throttle opening degree, a vehicle speed sensor 45 detecting a vehicle speed, an engine rotation speed sensor 46 detecting an engine rotation speed, and the like.

Figure 5:
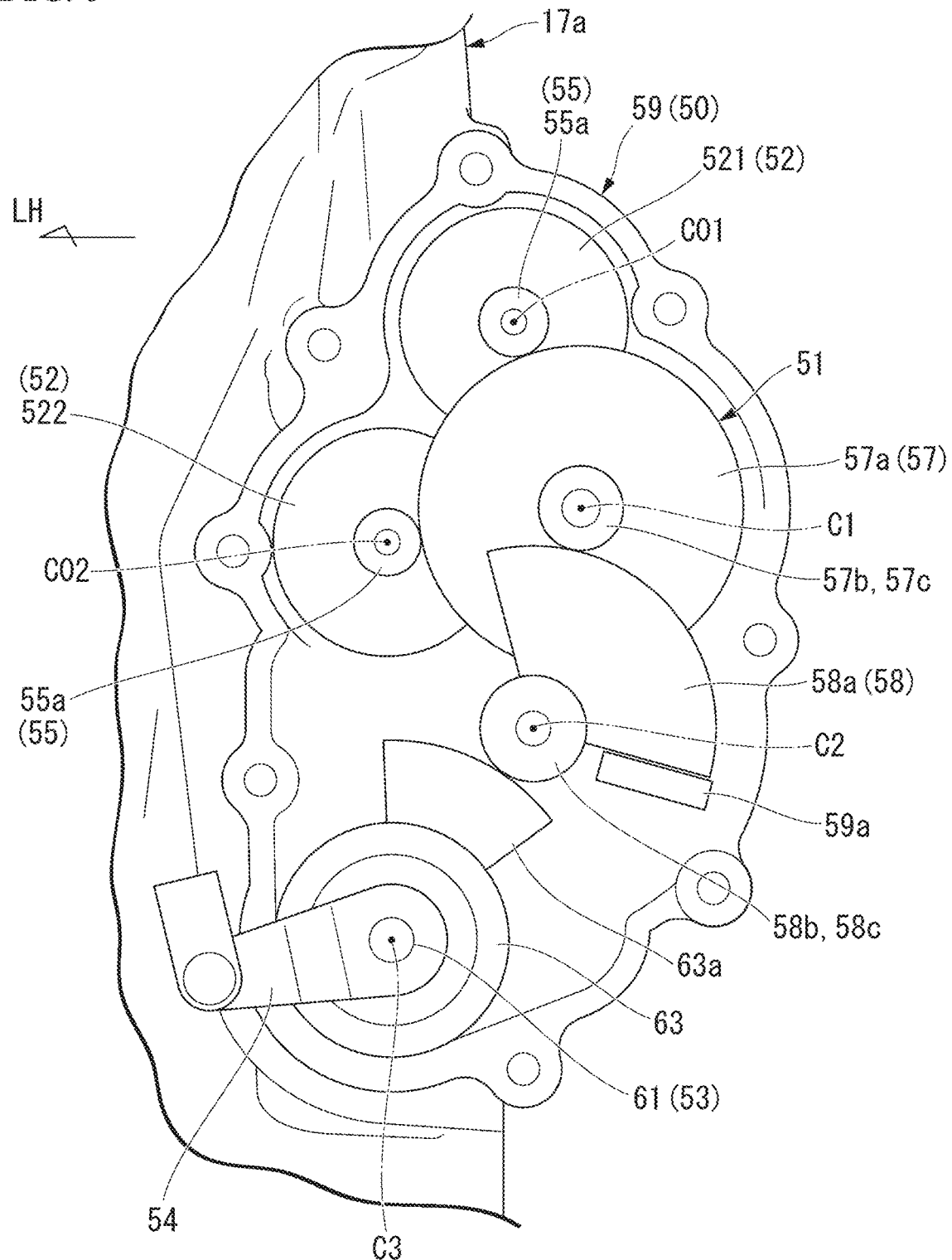
FIG. 5 is a view in a direction of the arrow V in FIG. 1, illustrating a clutch actuator in an axial direction.
Figure 6:
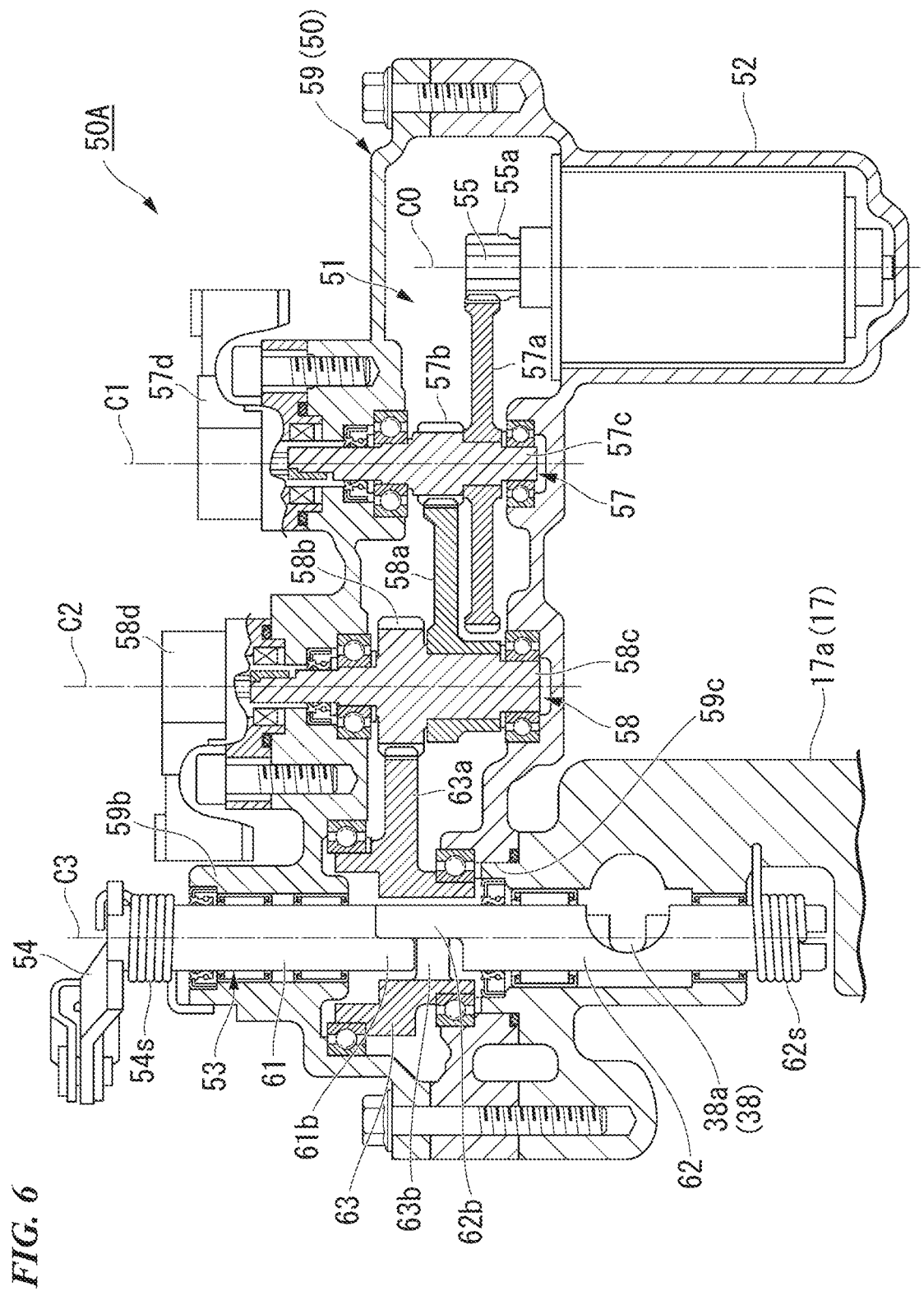
FIG. 6 is a developed cross-sectional view of the clutch actuator in the axial direction.

Referring also to FIGS. 5 and 6, the clutch actuator 50 controls an operating torque applied to a release shaft 53 to connect or disconnect the clutch device 26. The clutch actuator 50 includes an electric motor 52 (hereinafter simply referred to as "motor 52") as a drive source, and a speed reduction mechanism 51 that transmits a driving force of the motor 52 to the release shaft 53. The speed reduction mechanism 51 includes a first reduction shaft 57 and a second reduction shaft 58, and a first rotation angle sensor 57d and a second rotation angle sensor 58d detecting rotation angles are respectively provided in the shafts 57 and 58.

The ECU 40 calculates a current value supplied to the motor 52 to connect or disconnect the clutch device 26 on the basis of a preset calculation program. The current supplied to the motor 52 is determined from a correlation with a torque that is output by the motor 52. A target torque of the motor 52 is proportional to an operating torque (release shaft torque to be described later) applied to the release shaft 53. The current value supplied to the motor 52 is detected by a current sensor 40b included in the ECU 40. The clutch actuator 50 is operated and controlled according to a change in detected value. The clutch actuator 50 will be described in detail later.

<Clutch Device>

Figure 11:
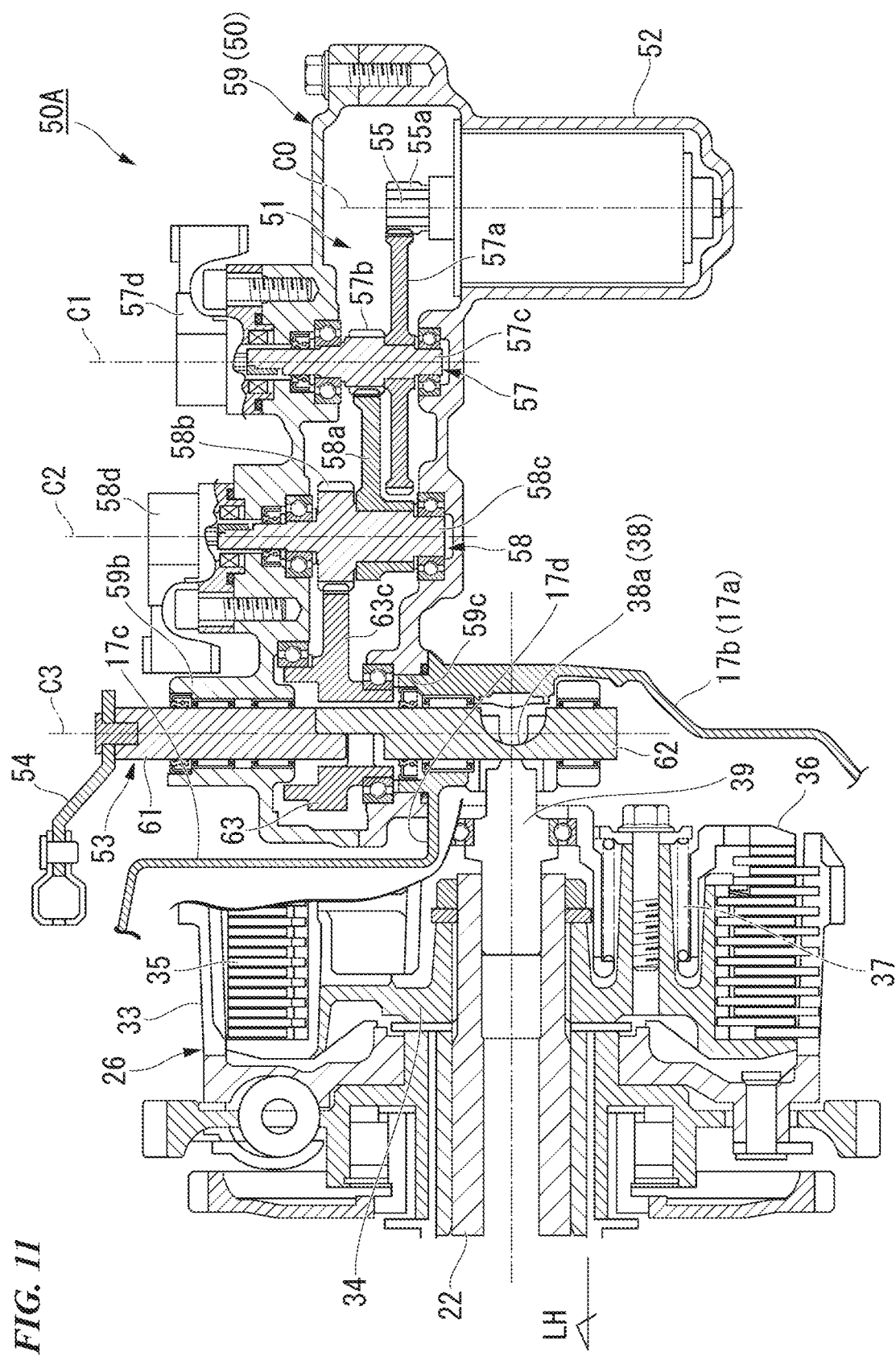
FIG. 11 is a cross-sectional view corresponding to FIG. 6 with the clutch actuator attached to a right cover.

As illustrated in FIGS. 2 and 11, the clutch device 26 of the embodiment is a multi-plate clutch in which a plurality of clutch plates 35 are stacked in an axial direction and is a wet clutch disposed in an oil chamber in the right cover 17a. The clutch device 26 includes a clutch outer 33 driven by constant transmission of rotational power from the crankshaft 14, a clutch center 34 disposed in the clutch outer 33 and supported by the main shaft 22 to be integrally rotatable, and the plurality of clutch plates 35 stacked between the clutch outer 33 and the clutch center 34 to frictionally engage them.

A pressure plate 36 having substantially the same diameter as the clutch plates 35 is disposed on a right side (on an outward side in the vehicle width direction) of the stacked clutch plates 35. The pressure plate 36 is biased to the left by receiving a repulsive load of a clutch spring 37 to bring the stacked clutch plates 35 into pressure contact with each other (to frictionally engage them). Thereby, the clutch device 26 is in a connected state in which power can be transmitted. The clutch device 26 is a normally closed clutch that is in a connected state normally when there is no external input.

The pressure contact (frictional engagement) is released by an operation of a release mechanism 38 inside the right cover 17a. The release mechanism 38 is operated by at least one of an operation of the clutch lever (not illustrated) by the rider and application of a torque by the clutch actuator 50.

<Release Mechanism>

As illustrated in FIGS. 2 and 11, the release mechanism 38 includes a lifter shaft 39 held in a right portion of the main shaft 22 to be able to reciprocate in the axial direction, and the release shaft 53 disposed so that an axial direction thereof is orthogonal to the lifter shaft 39 and held at an outer portion of the right cover 17a to be rotatable around an axis thereof. The line C3 in the drawings indicates a central axis of the release shaft 53 extending in a vertical direction. The release shaft 53 is configured such that an axial direction thereof is inclined rearward to be positioned on a rearward side toward an upper side with respect to the vertical direction when viewed in an axial direction of the main shaft 22 (in a vehicle side view) (see FIG. 1). An upper portion of the release shaft 53 protrudes toward the outside of the right cover 17a, and a driven clutch lever 54 is attached to the upper portion of the release shaft 53 to be integrally rotatable. The driven clutch lever 54 is connected to the clutch lever described above via an operating cable (not illustrated).

An eccentric cam part 38a is provided at a lower portion of the release shaft 53 positioned inside the right cover 17a. The eccentric cam part 38a engages with a right end portion of the lifter shaft 39. When the release shaft 53 rotates around an axis thereof, it moves the lifter shaft 39 to the right by an action of the eccentric cam part 38a. The lifter shaft 39 is configured to be able to reciprocate integrally with the pressure plate 36 of the clutch device 26. Therefore, when the lifter shaft 39 moves to the right, the pressure plate 36 moves (lifts) to the right against a biasing force of the clutch spring 37, and the frictional engagement between the stacked clutch plates 35 is released. Thereby, the normally closed clutch device 26 is in a disconnected state in which power cannot be transmitted.

Further, the release mechanism 38 is not limited to an eccentric cam mechanism, and may include a rack and pinion, a feed screw, or the like. The above-described mechanism connecting the clutch lever and the driven clutch lever 54 is not limited to the operating cable, and may include a rod, a link, or the like.

<Clutch Control Mode>

Figure 4:
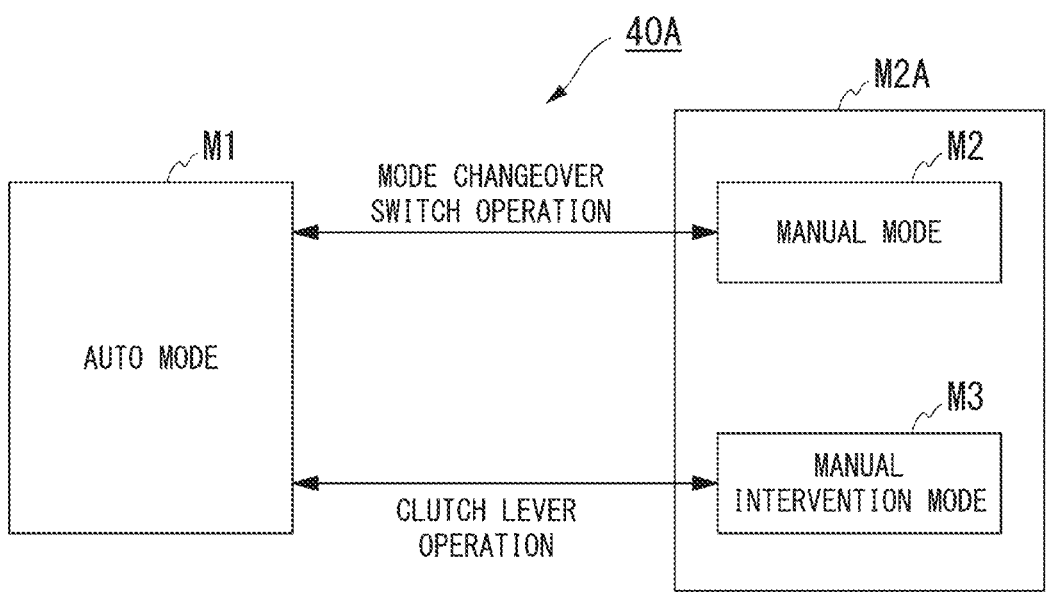
FIG. 4 is an explanatory diagram showing a transition between clutch control modes of the motorcycle.

As shown in FIG. 4, a clutch control device 40A of the present embodiment has three types of clutch control modes. The clutch control mode appropriately transitions between three modes of an auto mode M1 in which automatic control is performed, a manual mode M2 in which a manual operation is performed, and a manual intervention mode M3 in which a temporary manual operation is performed according to operations of a clutch control mode changeover switch 49 (see FIG. 3) and the clutch operator. Further, a coverage including the manual mode M2 and the manual intervention mode M3 is referred to as a manual system M2A.

The auto mode M1 is a mode in which the clutch device 26 is controlled by calculating a clutch capacity suitable for a traveling state according to automatic start/gear shift control. The manual mode M2 is a mode in which the clutch device 26 is controlled by calculating a clutch capacity according to a clutch operation instruction by the rider. The manual intervention mode M3 is a temporary manual operation mode in which a clutch operation instruction from the rider is received during the auto mode M1 and a clutch capacity is calculated from the clutch operation instruction to control the clutch device 26. Further, for example, if a state in which the rider has stopped an operation of the clutch operator (completely released state) continues for a specified period of time during the manual intervention mode M3, the clutch control device 40A may be set to return to the auto mode M1.

For example, when the system is started, the clutch control device 40A starts control from a clutch-on state (connected state) in the auto mode M1. Also, when the engine 13 is stopped (when the system is off), the clutch control device 40A is set to return to the clutch on in the auto mode M1. In the normally closed clutch device 26, there is no need to supply power to the motor 52 of the clutch actuator 50 when the clutch is on. On the other hand, when the clutch device 26 is in a clutch-off state (disconnected state), power supply to the motor 52 is maintained.

The auto mode M1 basically performs the clutch control automatically and enables the motorcycle 1 to travel without a lever operation. In the auto mode M1, the clutch capacity is controlled on the basis of a throttle opening degree, an engine rotation speed, a vehicle speed, an output of a shift sensor, and the like. Thereby, the motorcycle 1 can be started simply by a throttle operation without an engine stall (meaning an engine stop or engine stall), and gear shifting is possible simply by a shift operation. Also, in the auto mode M1, the mode is switched to the manual intervention mode M3 by the rider grasping the above-described clutch lever, and the clutch device 26 can be arbitrarily disconnected.

On the other hand, in the manual mode M2, the clutch capacity can be controlled by a lever operation by the rider (that is, the clutch device 26 can be connected or disconnected). The auto mode M1 and the manual mode M2 can be alternately switched by operating the clutch control mode changeover switch 49 (see FIG. 3) while the motorcycle 1 is stopped and the transmission 21 is in neutral. Further, the clutch control device 40A may include an indicator indicating that the clutch control device 40A is in the manual state at the time of transition to the manual system M2A (the manual mode M2 or the manual intervention mode M3).

The manual mode M2 basically performs the clutch control manually and can control the clutch capacity according to an operating angle of the above-described clutch lever (and thus an operating angle of the release shaft 53). Thereby, connection and disconnection of the clutch device 26 can be controlled at the will of the rider. Further, even in the manual mode M2, the clutch control can automatically intervene during a shift operation without the clutch operation. Hereinafter, the operating angle of the release shaft 53 will be referred to as a release shaft operating angle.

In the auto mode M1, connection and disconnection of the clutch device 26 is automatically performed by the clutch actuator 50, but when a manual clutch operation is performed with respect to the above-described clutch lever, the manual operation can be temporarily intervened in the automatic control of the clutch device 26 (the manual intervention mode M3).

Also, the clutch control mode changeover switch 49 is provided, for example, on a handle switch attached to the steering handle 4a. Thereby, the rider can easily switch the clutch control mode during normal driving.

<Clutch Actuator>

As illustrated in FIG. 1, the clutch actuator 50 is attached to a rear upper portion of the right cover 17a on a right side of the crankcase 15.

Referring also to FIGS. 5 and 6, the clutch actuator 50 includes the motor 52 and the speed reduction mechanism 51 that transmits a driving force of the motor 52 to the release shaft 53.

The motor 52 is, for example, a DC motor, and is disposed, for example, with an axial direction parallel to the release shaft 53. The motor 52 is disposed so that a drive shaft 55 protrudes upward.

In the embodiment, a plurality of (two) motors 52 are provided with respect to the single clutch actuator 50. Hereinafter, the motor 52 positioned on a vehicle front side of the clutch actuator 50 will be referred to as a first motor 521, and the motor 52 positioned on a vehicle rear side and a vehicle width direction inner side with respect to the first motor 521 will be referred to as a second motor 522. The lines C01 and C02 in the drawing indicate central axes (drive axes) of the motors 521 and 522. For convenience of explanation, both the motors 521 and 522 may be collectively referred to as the motor 52. Also, both the axes C01 and C02 may be collectively referred to as an axis C0.

The speed reduction mechanism 51 decelerates rotational power output from the motor 52 and transmits it to the release shaft 53. The speed reduction mechanism 51 includes, for example, a gear train whose axial direction is parallel to the release shaft 53. The speed reduction mechanism 51 includes a drive gear 55a provided integrally with the drive shaft 55 of each of the motors 521 and 522, a first reduction gear 57a with which each drive gear 55a meshes, a first small diameter gear 57b that is coaxial with the first reduction gear 57a, a second reduction gear 58a with which the first small diameter gear 57b meshes, a second small diameter gear 58b that is coaxial with the second reduction gear 58a, a driven gear 63a with which the second small diameter gear 58b meshes, and a gear case 59 that houses the gears.

The first reduction gear 57a and the first small diameter gear 57b are supported by a first support shaft 57c to be integrally rotatable, and these constitute the first reduction shaft 57. The second reduction gear 58a and the second small diameter gear 58b are supported by a second support shaft 58c to be integrally rotatable, and these constitute the second reduction shaft 58. The first support shaft 57c and the second support shaft 58c are each rotatably supported by the gear case 59. The second reduction gear 58a is a fan-shaped gear centered on the second support shaft 58c, and is provided to extend forward of the second support shaft 58c and outward in the vehicle width direction. The line C1 in the drawings indicates a central axis of the first reduction shaft 57, and the line C2 indicates a central axis of the second reduction shaft 58.

The driven gear 63a is provided on the release shaft 53 to be integrally rotatable. The driven gear 63a is a fan-shaped gear centered on the release shaft 53, and is provided to extend forward of the release shaft 53. A gear on a downstream side in the speed reduction mechanism 51 has a small rotation angle, and the second reduction gear 58a and the driven gear 63a can be configured as fan-shaped gears with a small rotation angle.

As a result, the speed reduction mechanism 51 and thus the clutch actuator 50 can be miniaturized. That is, even when a large-diameter speed reduction gear is provided to increase a speed reduction ratio, when a part other than a meshing range of the speed reduction gear is cut out to shape it into a fan shape, particularly, the speed reduction mechanism 51 protruding outward in the vehicle width direction can be suppressed, and weight reduction of the speed reduction mechanism 51 can be achieved.

With this configuration, the motor 52 and the release shaft 53 can be constantly interlocked via the speed reduction mechanism 51. Thereby, a system in which the clutch actuator 50 directly connects and disconnects the clutch device 26 is configured.

Each gear is a flat spur gear with a reduced thickness in the axial direction, and the gear case 59 is also formed in a flat shape with a reduced thickness in the axial direction. Thereby, the speed reduction mechanism 51 becomes less visually noticeable in a vehicle side view. The first rotation angle sensor 57d and the second rotation angle sensor 58d connected to one end portion of each of the first reduction shaft 57 and the second reduction shaft 58 to detect rotation angles of them are provided on an upper surface side of the gear case 59.

The motor 52 is disposed to protrude downward from a front portion of the gear case 59. Thereby, the motor 52 can be disposed forward to avoid a bulging part 17b that covers the clutch device 26 in the right cover 17a, and the clutch actuator 50 protruding outward in the vehicle width direction can be suppressed.

The driving force of the motor 52 is reduced between the drive gear 55a and the first reduction gear 57a, reduced between the first small diameter gear 57b and the second reduction gear 58a, and further reduced between the second small diameter gear 58b and the driven gear 63a to be transmitted to the release shaft 53.

In the embodiment, a stopper 59a that defines an initial position of the release shaft 53 (a stop position in a return direction opposite to a clutch disconnection direction) is provided before a final stage of the gear train of the speed reduction mechanism 51 (between the second small diameter gear 58b and the driven gear 63a). The stopper 59a is integrally formed, for example, inside the gear case 59 and defines a stop position of the second reduction gear 58a by bringing a lateral side of the fan-shaped second reduction gear 58a into contact therewith. When the stopper 59a is provided at a stage having a smaller torque than the final stage of the speed reduction mechanism 51, the initial position of the release shaft 53 can be reliably defined while suppressing a strength of the gear case 59. An excessive load is prevented from being input to the final stage in which the torque is maximized due to deceleration, and the gear can be made smaller and lighter.

<Disposition of Clutch Actuator>

Figure 15:
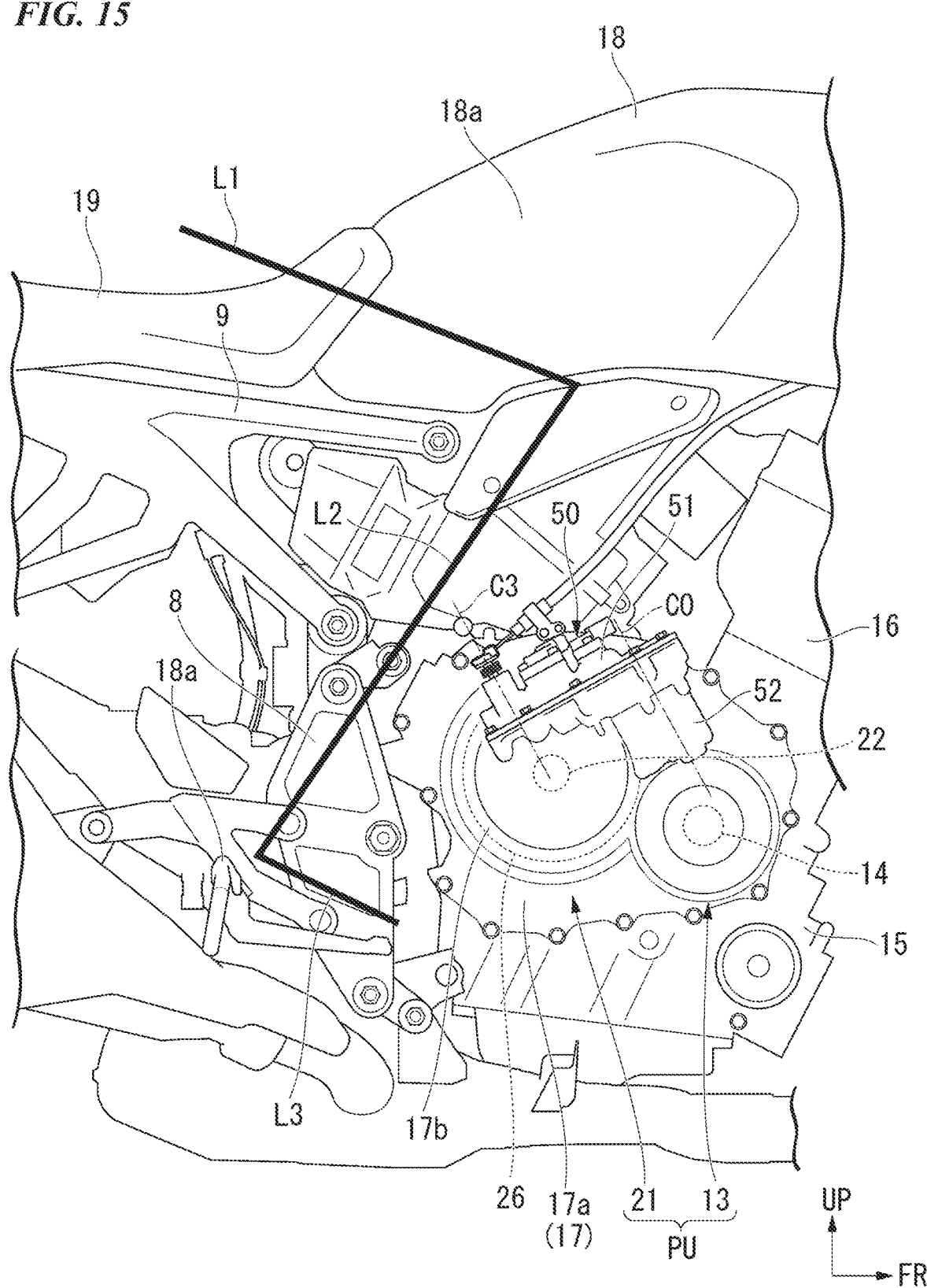
FIG. 15 is a right side view illustrating a main part of the motorcycle.
Figure 16:
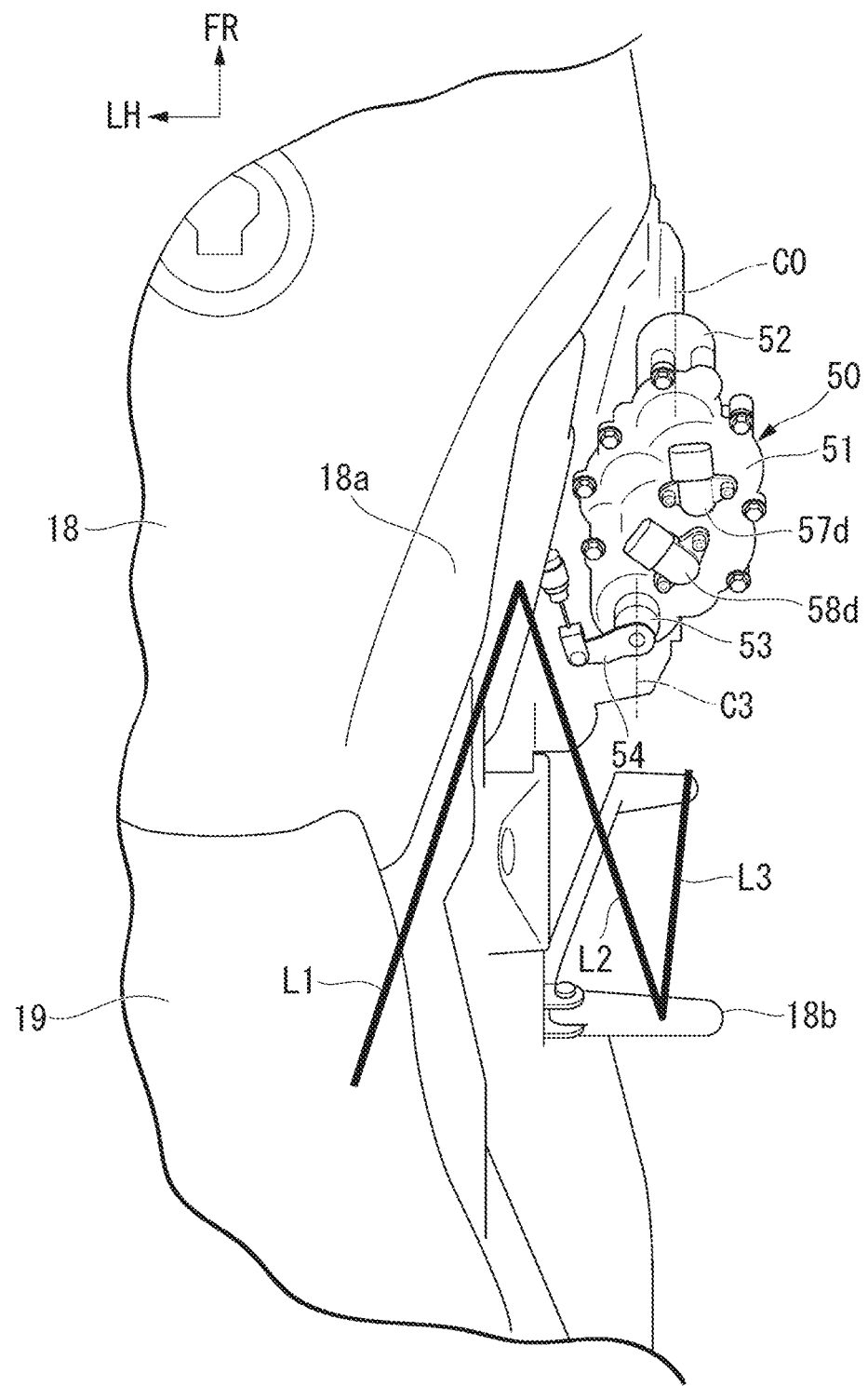
FIG. 16 is a top view illustrating a main part of the motorcycle.
Figure 17:
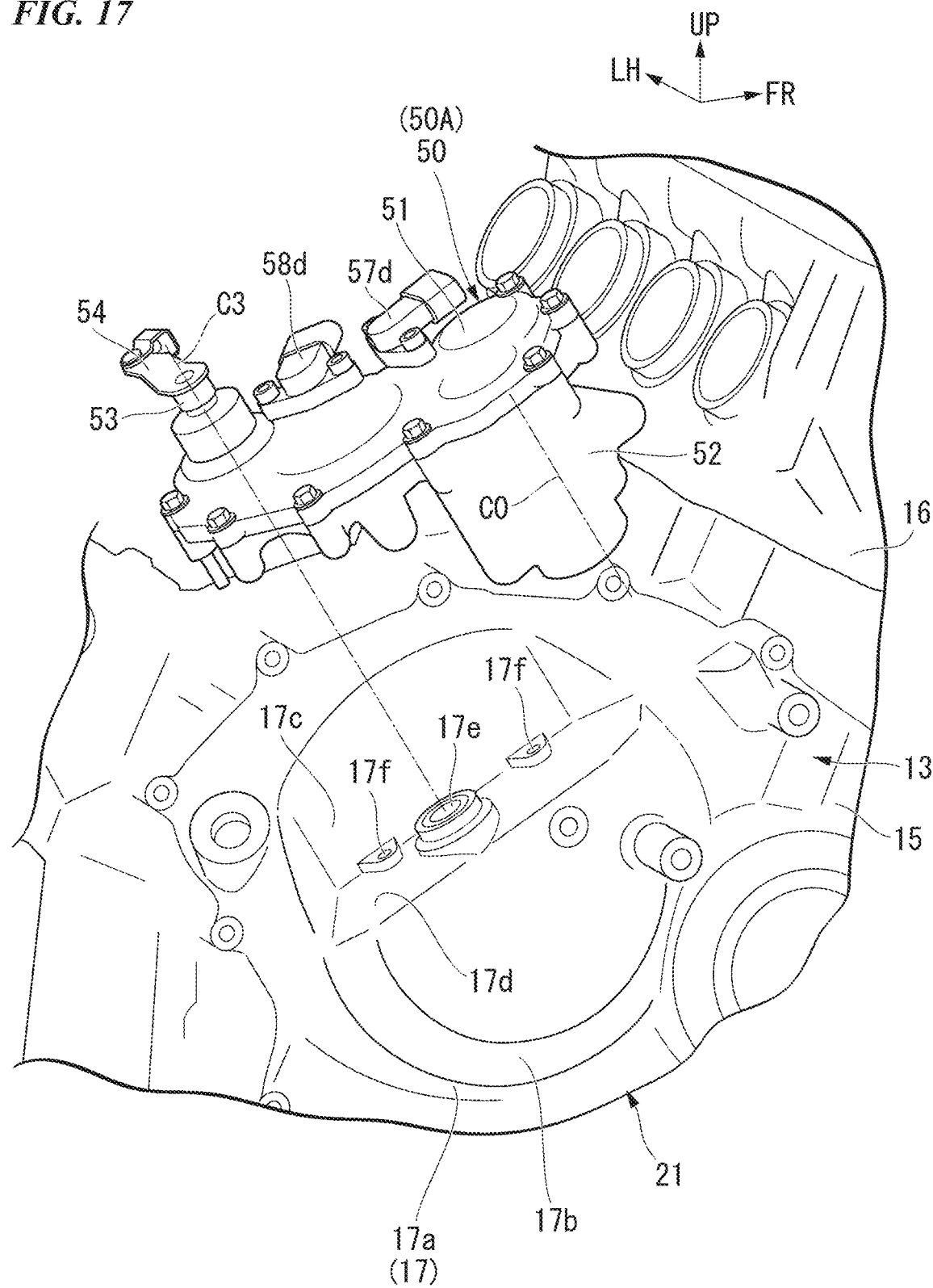
FIG. 17 is an exploded perspective view illustrating a main part of the motorcycle.

As illustrated in FIGS. 15 to 17, the clutch actuator 50 is disposed vertically below the knee grip part 18a on a right side of the fuel tank 18 in a vehicle side view. The clutch actuator 50 is disposed to protrude outward in the vehicle width direction from the knee grip part 18a on the right side of the fuel tank 18 in a vehicle side view in FIG. 16. In the drawings, the line L1 represents an image of a thigh portion of the driver's leg, the line L2 represents an image of a lower leg portion below the knee, and the line L3 represents an image of a foot portion from the ankle forward.

In the vehicle side view, the driver's leg is illustrated such that the lower leg portion L2 extends obliquely rearward and downward from the knee grip part 18a, and the foot portion L3 is placed on the step 18b. The clutch actuator 50 protrudes outward in the vehicle width direction from the knee grip part 18a, but is disposed forward to avoid the lower leg portion L2 of the driver's leg in a vehicle side view. Thereby, interference of the clutch actuator 50 with a space for disposing the driver's leg is suppressed. Even if the driver extends his/her leg and lands the foot portion L3 on the ground, the clutch actuator 50 is disposed forward to avoid the lower leg portion L2 of the driver's leg in a vehicle side view. In this respect also, interference of the clutch actuator 50 with a space for disposing the driver's leg is suppressed.

Referring to FIG. 17, in the right cover 17a, a circular range coaxial with the clutch device 26 in a vehicle side view is the bulging part 17b that bulges outward in the vehicle width direction. A cover recessed part 17c whose outer surface is turned inward in the vehicle width direction with respect to the remaining part is formed at a portion of the bulging part 17b facing rearward and upward. The cover recessed part 17c has a semicircular shape in a vehicle side view.

A chord portion of the semicircular shape of the cover recessed part 17c is formed in a straight line orthogonal to an axial direction of the release shaft 53 in a vehicle side view. This chord portion forms a stepped part 17d that turns an outer surface of the bulging part 17b into a stepped shape. The stepped part 17d is inclined downward to the rear in a vehicle side view. An upper portion of the release shaft 53 protrudes obliquely upward and rearward from the stepped part 17d. The release shaft 53 penetrates the stepped part 17d of the cover recessed part 17c and protrudes to the outside of the cover. The clutch actuator 50 is attached to the right cover 17a in a state in which it is disposed to enter the cover recessed part 17c.

<Release Shaft>

Figure 7:
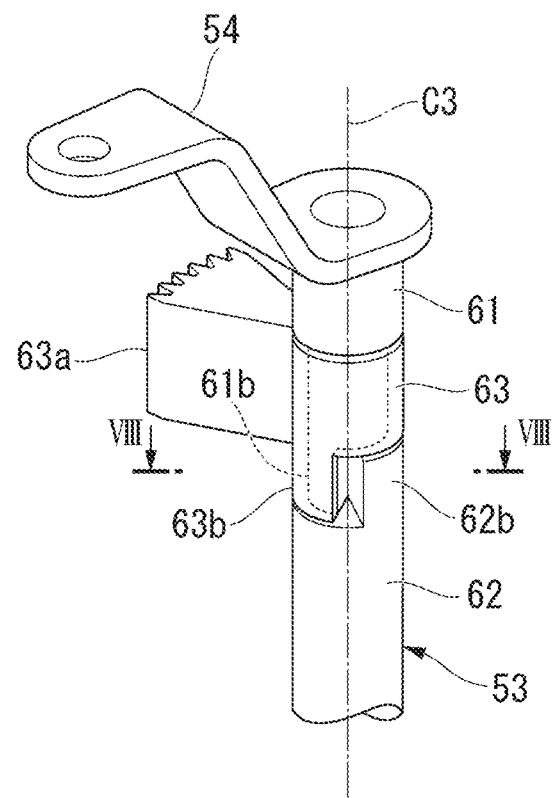
FIG. 7 is a perspective view of a release shaft that operates a clutch device.
Figure 8:
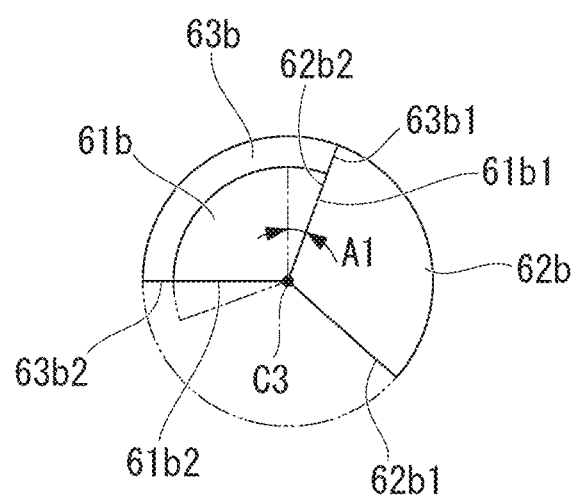
FIG. 8 is a cross-sectional view along line VIII-VIII in FIG. 7.

As illustrated in FIGS. 6 to 8, the release shaft 53 is divided into a plurality of elements to be rotatable by individually receiving an input from the clutch actuator 50 and an input from a rider's operation.

The release shaft 53 includes an upper release shaft 61 forming an upper portion, a lower release shaft 62 forming a lower portion, and an intermediate release shaft 63 disposed across a lower end portion of the upper release shaft 61 and an upper end portion of the lower release shaft 62.

The upper release shaft 61 has a columnar shape and is rotatably supported by an upper boss part 59b of the gear case 59. The upper release shaft 61 has an upper end portion protruding toward the outside of the gear case 59, and the driven clutch lever 54 is supported by the upper end portion to be integrally rotatable. A return spring 54s, which applies a biasing force in a direction opposite to rotation (rotation in a clutch disconnection direction) due to an operation of the clutch operator to the driven clutch lever 54, is attached to the driven clutch lever 54.

The lower release shaft 62 has a columnar shape, and a lower portion thereof is rotatably supported inside the right cover 17a. An eccentric cam part 38a of the release mechanism 38 is formed at a lower portion of the lower release shaft 62 facing the inside of the gear case 59. A lower return spring 62s, which applies a biasing force in a direction opposite to rotation in a clutch disconnection direction to the lower release shaft 62, is attached to a lower end portion of the lower release shaft 62.

A manual operation side cam 61b having a fan-shaped cross section and extending in the axial direction is provided at the lower end portion of the upper release shaft 61.

A clutch side cam 62b, which has a fan-shaped cross section and extends in the axial direction in a range that avoids the manual operation side cam 61b in a circumferential direction or an axial direction, is provided at the upper end portion of the lower release shaft 62.

The lower end portion (the manual operation side cam 61b) of the upper release shaft 61 and the upper end portion (the clutch side cam 62b) of the lower release shaft 62 overlap in axial position while avoiding each other in the circumferential direction (or overlap in circumferential position while avoiding each other in the axial direction). Thereby, the lower release shaft 62 can be rotated by pressing the other circumferential side surface 62b2 of the clutch side cam 62b with one circumferential side surface 61b1 of the manual operation side cam 61b (see FIGS. 9(b) and 10(b)).

The other circumferential side surface 61b2 of the manual operation side cam 61b and the one circumferential side surface 62b1 of the clutch side cam 62b are separated from each other in the circumferential direction or the axial direction. Thereby, if there is an input from the clutch actuator 50 to the clutch side cam 62b, the lower release shaft 62 can rotate independently of the upper release shaft 61 (see FIGS. 9(a) and 10(a)).

The intermediate release shaft 63 has a cylindrical shape through which an engagement portion (vertical shaft engagement portion) between the lower end portion of the upper release shaft 61 and the upper end portion of the lower release shaft 62 can be inserted. The driven gear 63a is supported by the intermediate release shaft 63 to be integrally rotatable.

A control operation side cam 63b having a fan-shaped cross section and extending in the axial direction is provided in the intermediate release shaft 63.

Contacts of the intermediate release shaft 63 and the driven gear 63a with other components of clutch actuator 50 are curbed. Specifically, the intermediate release shaft 63, in addition to being in contact with a bearing supporting it on the gear case 59, only makes contact with the lower end portion (the manual operation side cam 61b) of the upper release shaft 61 and the upper end portion (the clutch side cam 62b) of the lower release shaft 62 at an inner circumferential portion thereof. Also, the driven gear 63a only makes contact with the second small diameter gear 58b at gear teeth thereof. Thereby, friction of the driven gear 63a, which is a control gear, is reduced as much as possible, and an accuracy of control of the release shaft 53 is improved.

The control operation side cam 63b of the intermediate release shaft 63 and the clutch side cam 62b of the lower release shaft 62 overlap in axial position while avoiding each other in the circumferential direction (or overlap in circumferential position while avoiding each other in the axial direction). Thereby, the lower release shaft 62 can be rotated by pressing the other circumferential side surface 62b2 of the clutch side cam 62b with one circumferential side surface 63b1 of the control operation side cam 63b.

Also, the control operation side cam 63b is disposed to avoid the manual operation side cam 61b of the upper release shaft 61 in an axial direction or a radial direction. Thereby, when an input from the clutch actuator 50 is transmitted to the clutch side cam 62b, the lower release shaft 62 can rotate independently of the upper release shaft 61. Also, if a manual operation is performed, the upper release shaft 61 can rotate independently of the intermediate release shaft 63 on a control side.

The other circumferential side surface 63b2 of the control operation side cam 63b and the one circumferential side surface 62b1 of the clutch side cam 62b are separated from each other in the circumferential direction. Thereby, if there is an input from the manual operation side cam 63b to the clutch side cam 62b, the lower release shaft 62 can rotate independently of the intermediate release shaft 63.

Referring to FIGS. 11 and 17, the clutch actuator 50 holds the upper release shaft 61 and the intermediate release shaft 63 to be rotatable in the gear case 59. The clutch actuator 50 includes the upper release shaft 61 and the intermediate release shaft 63 to constitute an integrated actuator unit 50A.

The lower release shaft 62 is held to be rotatable by the right cover 17a. On the stepped part 17d of the cover recessed part 17c of the right cover 17a, an opening 17e from which the upper end portion of the lower release shaft 62 protrudes is provided, and a fastening part 17f of the gear case 59 is provided. An opening 59c that allows the upper end portion of the lower release shaft 62 to face the inside of the gear case 59 is provided at a portion of the gear case 59 facing the stepped part 17d of the cover recessed part 17c.

In such a configuration, when the actuator unit 50A is attached to the right cover 17a, the upper release shaft 61, the intermediate release shaft 63, and the lower release shaft 62 are connected to each other to form the linear release shaft 53.

In contrast to a manual clutch type power unit in which connection and disconnection operations of the clutch device 26 are performed by a driver's operation without electric control, the power unit PU of the embodiment can be configured by replacing the right cover 17a and the release shaft 53 and retrofitting the actuator unit 50A. Therefore, the actuator unit 50A can be attached even to power units of different models, and a semi-automatic transmission system (automatic clutch type transmission system) can be easily configured by sharing the actuator unit 50A among multiple models.

<Clutch Control>

Figure 12:
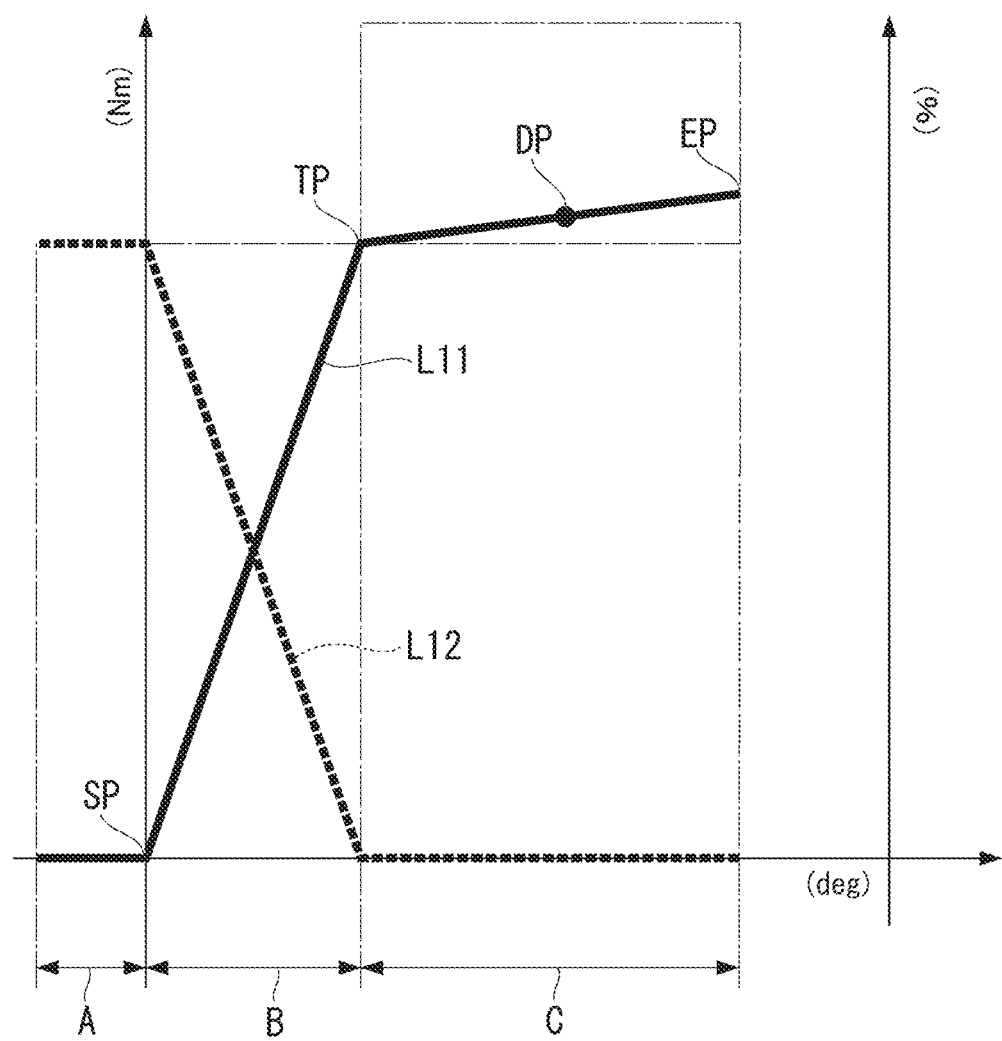
FIG. 12 is a graph showing characteristics of a clutch control, in which the vertical axis represents an output value of the clutch actuator, and the horizontal axis represents an amount of operation of a release mechanism.

Next, a clutch control of the embodiment will be described with reference to the graph in FIG. 12. The graph in FIG. 12 is an image of clutch characteristics in the auto mode M1 described above. In the graph of FIG. 12, the vertical axis represents a torque (Nm) and a clutch capacity (%) applied to the release shaft 53, and the horizontal axis represents an operating angle (deg) of the release shaft 53.

A torque generated in the release shaft 53 corresponds to a torque value calculated by multiplying a torque value obtained on the basis of a current value supplied to the motor 52 from a correlation between a current supplied to the motor 52 and a torque generated by the motor 52 by a speed reduction ratio of the speed reduction mechanism 51. Hereinafter, the torque of the release shaft 53 will be referred to as a release shaft torque. A correlation between the release shaft operating angle and the release shaft torque is shown by the line L11 in the graph. A correlation between the release shaft operating angle and the clutch capacity is shown by the line L12 in the graph.

In the auto mode M1 of the normally closed clutch, when the release shaft torque (motor output) is "0," there is no operation input to the clutch device 26 (no input to the disconnection side) and the clutch capacity is 100%. That is, the clutch device 26 maintains an connected state. This state corresponds to a region A on the horizontal axis in FIG. 12. The region A is a play region of the driven clutch lever 54. In the region A, there is no motor output, and the release shaft torque transitions to "0". In the region A, the clutch device 26 is not operated and the clutch capacity transitions to 100%.

Referring also to FIG. 8, in the region A, the one circumferential side surface 61b1 of the manual operation side cam 61b of the release shaft 53 does not press the other circumferential side surface 62b2 of the clutch side cam 62b, and is separated from the clutch side cam 62b by a biasing force of the return spring 54s (indicated by the chain line in FIG. 8). In the region A, the driven clutch lever 54 is in a play state in which the manual operation side cam 61b can come close to and move away from the clutch side cam 62b by an angle A1 in the drawing. For example, the region A represents a state in which the one circumferential side surface 63b1 of the control operation side cam 63b is in contact with the other circumferential side surface 62b2 of the clutch side cam 62b.

Referring to FIG. 12, when the release shaft operating angle increases and passes the play region A, the release shaft operating angle shifts to a half-clutch region B.

Figure 9:
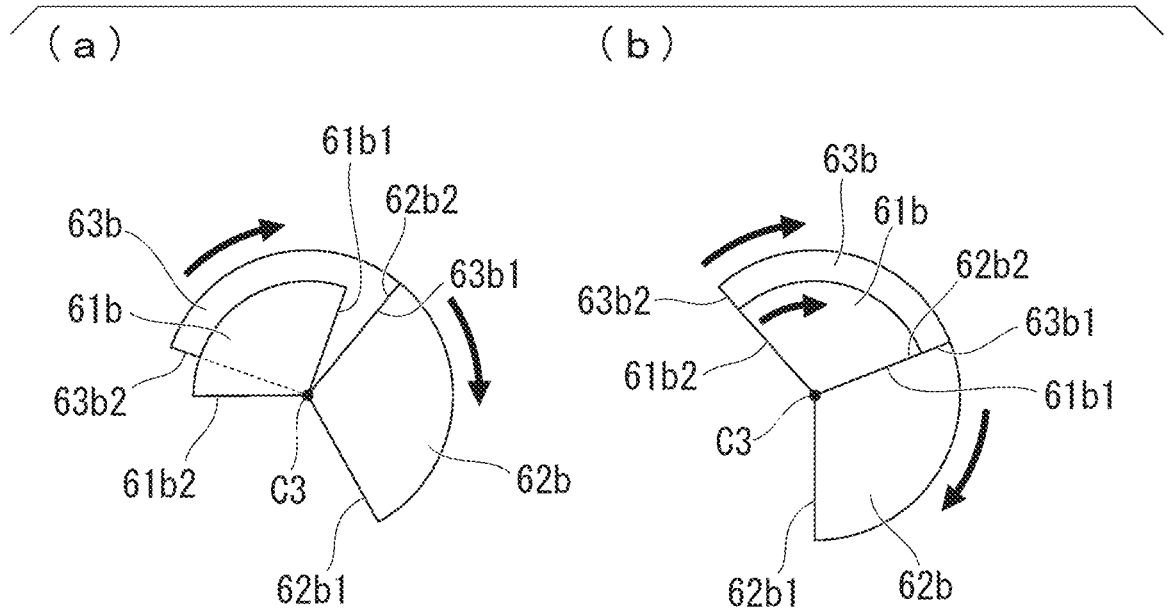
FIG. 9 is a cross-sectional view corresponding to FIG. 8 illustrating an action of the release shaft in a half-clutch region, in which (a) illustrates a case when the clutch actuator is used for driving, and (b) illustrates a case when a manual intervention is performed.

Referring also to FIG. 9(a), in the half-clutch region B, the control operation side cam 63b presses the clutch side cam 62b to rotate the lower release shaft 62. When the release shaft torque increases, the release mechanism 38 operates to lift the clutch device 26 and reduces the clutch capacity. That is, the clutch device 26 is in a half-clutch state in which a part of power can be transmitted. Reference sign SP in FIG. 12 indicates a start position (operation start position) of an operation that switches from the play region A to the half-clutch region B. When a manual operation intervenes in the half-clutch region B, the manual operation side cam 61b comes into contact with the clutch side cam 62b and rotates the lower release shaft 62 in cooperation with the control operation side cam 63b (see FIG. 9(b)).

When the release shaft operating angle passes a touch point TP which is an end point of the half-clutch region B, an increase in the release shaft torque becomes gentler than that in the half-clutch region B. A region after the touch point TP in the release shaft operating angle is, for example, a clutch disconnection region C in which the clutch capacity remains equivalent to "0". The clutch disconnection region C is, for example, an operating margin region in which the release shaft 53 and the like operate to a mechanical operating limit position. In the clutch disconnection region C, the release shaft torque increases slightly. This increase corresponds to an increase in clutch spring load due to movement of lift components of the clutch device 26. Reference sign EP in FIG. 12 indicates a full lift position which is an end point of the clutch disconnection region C.

A standby position DP is set, for example, in the middle of the clutch disconnection region C. A slightly higher release shaft torque is applied at the standby position DP than at the touch point TP at which the clutch device 26 starts connection. A slight torque transmission may occur at the touch point TP due to an operation error, but a torque transmission of the clutch device 26 is completely interrupted by applying the release shaft torque to the standby position DP. Also, at the standby position DP, it is possible for the clutch device 26 to perform a partial disconnection by applying a release shaft torque slightly lower than that at the full lift position EP. That is, at the standby position DP, cancelation of a backlash or an operational reaction force of each part in the clutch device 26 or the like is possible, and operational responsiveness during connection of the clutch device 26 can be enhanced.

Figure 13:
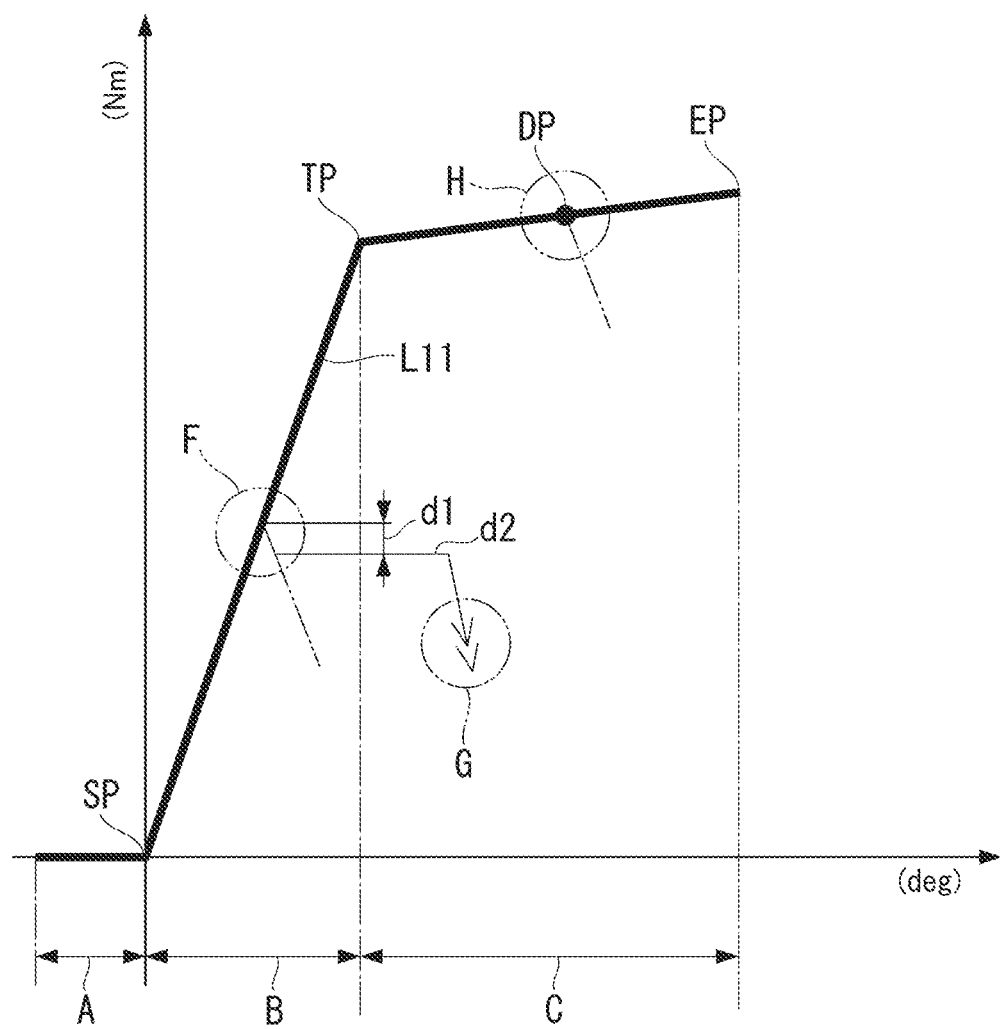
FIG. 13 is a graph corresponding to FIG. 12, showing a first action of the embodiment.

Referring to FIG. 13, in the half-clutch region B, a drive of the motor 52 is controlled on the basis of a lift load.

In this control, first, a clutch spring load is set in advance on the basis of an elastic force of the clutch spring 37. Next, a lift load acting on the clutch device 26 (an operating load against the clutch spring load) is estimated according to the release shaft torque. Then, a load obtained by subtracting the lift load from the clutch spring load is used as the clutch pressing load that is actually applied to the clutch device 26.

The clutch capacity is determined by "clutch pressing load/clutch spring load". Power supplied to the motor 52 is controlled, and the release shaft torque and thus the lift load are controlled so that the clutch capacity reaches a target value. A motor current value and a lever operating angle at each of the operation start position SP and the touch point TP described above are set to preset values in advance, or, as will be described later, are set by a learning control when the motorcycle 1 is powered off or the like.

As an example of a sensing configuration, the current sensor 40b is provided in a motor control device (the ECU 40), and a detected value thereof is converted into a motor torque, and further converted into a release shaft torque (clutch operating torque).

As shown in FIG. 13, if the clutch lever operation (manual operation) described above intervenes in the half-clutch region B, an actual measured value of the release shaft torque decreases with respect to a correlation line L11 of the preset release shaft torque (see part F in the drawing). At this time, if an amount of decrease in the release shaft torque exceeds a predetermined threshold value d1, it is determined that there has been a manual operation intervention, and the processing proceeds to a predetermined manual operation intervention control.

In the manual operation intervention control, the motor 52 is feedback-controlled so that a torque d2 after the release shaft torque has decreased by the threshold value d1 is maintained, for example, within a predetermined specified period of time. During current control at this time, a current limit according to an angle is provided after the touch point TP, and a motor output becomes almost zero midway. Since the load at that time is sufficiently low, it is determined that there has been a manual intervention. Thereby, a discomfort due to a sudden disappearance of the torque from the motor 52 after the clutch lever operation described above can be prevented. After the specified period of time described above has elapsed, when the release shaft torque is gradually reduced (see part G in the drawing), power consumption caused by continuing to drive the motor 52 can be suppressed while suppressing the above-described discomfort.

In the clutch disconnection region C, the drive of the motor 52 is controlled on the basis of a lever position (angle).

As described above, in the clutch disconnection region C, an increase in the release shaft torque due to a lift of the clutch device 26 is small. Therefore, in the clutch disconnection region C, the power supplied to the motor 52 is controlled on the basis of the release shaft operating angle. Thereby, after the touch point TP at which the clutch device 26 starts connection, an amount of disconnection of the clutch device 26 can be controlled more precisely.

As an example of the sensing configuration, the first rotation angle sensor 57*d* and the second rotation angle sensor 58*d* are provided on the first reduction shaft 57 and the second reduction shaft 58, and detected values thereof are converted into the release shaft operating angles (clutch operating angles). Although a pair of the first rotation angle sensor 57*d* and the second rotation angle sensor 58*d* are provided for failover purposes, either one of them may be used.

As shown in FIG. 13, if the clutch lever operation (manual operation) described above intervenes in the clutch disconnection region C, the actual measured value of the release shaft torque decreases with respect to the correlation line L11 of the preset release shaft torque (see part H in the drawing).

Figure 10:
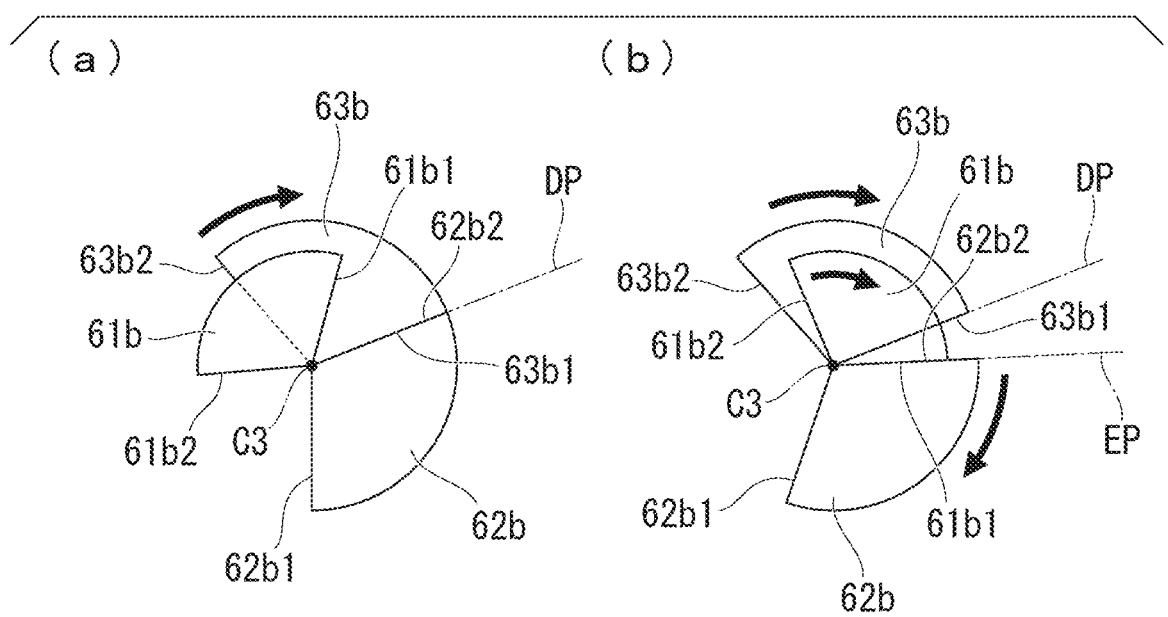
FIG. 10 is a cross-sectional view corresponding to FIG. 8 illustrating an action of the release shaft at a standby position, in which (a) illustrates a state when the clutch actuator is used for driving, and (b) illustrates a state when a manual intervention is performed.

Referring also to FIG. 10(*a*), for example, in the auto mode M1, an upper limit of a torque applied to the clutch side cam 62*b* by the control operation side cam 63*b* is a torque up to the standby position DP. The torque of the clutch side cam 62*b* exceeding the standby position DP and reaching the full lift position EP is a case in which a manual operation of gripping the above-described clutch lever has intervened, and a torques only exceeding the standby position DP has been applied from the manual operation side cam 61*b* to the clutch side cam 62*b* (see FIG. 10(*b*)). At this time, the control operation side cam 63*b* is separated from the clutch side cam 62*b*, and the motor output becomes substantially zero.

Even before reaching the standby position DP, if the release shaft operating angle is in the clutch disconnection region C beyond the touch point TP, the actual measured value of the release shaft torque becomes substantially zero due to the manual operation intervention. Therefore, if the actual measured value of the release shaft torque has changed to fall within a range in which it becomes substantially zero in the clutch disconnection region C, it is determined that there has been a manual operation intervention, and the processing proceeds to the predetermined manual operation intervention control.

In the manual operation intervention control, within the predetermined specified period of time, the motor output is maintained to keep the release shaft operating angle at the touch point TP which is the actual clutch disconnection position. Thereby, an engine stall is prevented from occurring even if the clutch lever is suddenly released after the manual operation intervention.

As described above, it is possible to perform a more precise clutch control (optimal control according to a state or characteristics of the clutch device 26) by suitably using the load (current) control and the position (angle) control according to a status of the clutch device 26.

Also, in the embodiment, a change in current value (converted into a torque value) of the motor 52 with respect to the release shaft operating angle is learned (updated) at a predetermined timing, and a target value is set according to a status of the clutch device 26. On the basis of the target value and the detected value of the current sensor 40*b* of the ECU 40, the drive of the motor 52 is feedback-controlled.

<Correction of Control Reference Value>

Figure 14:
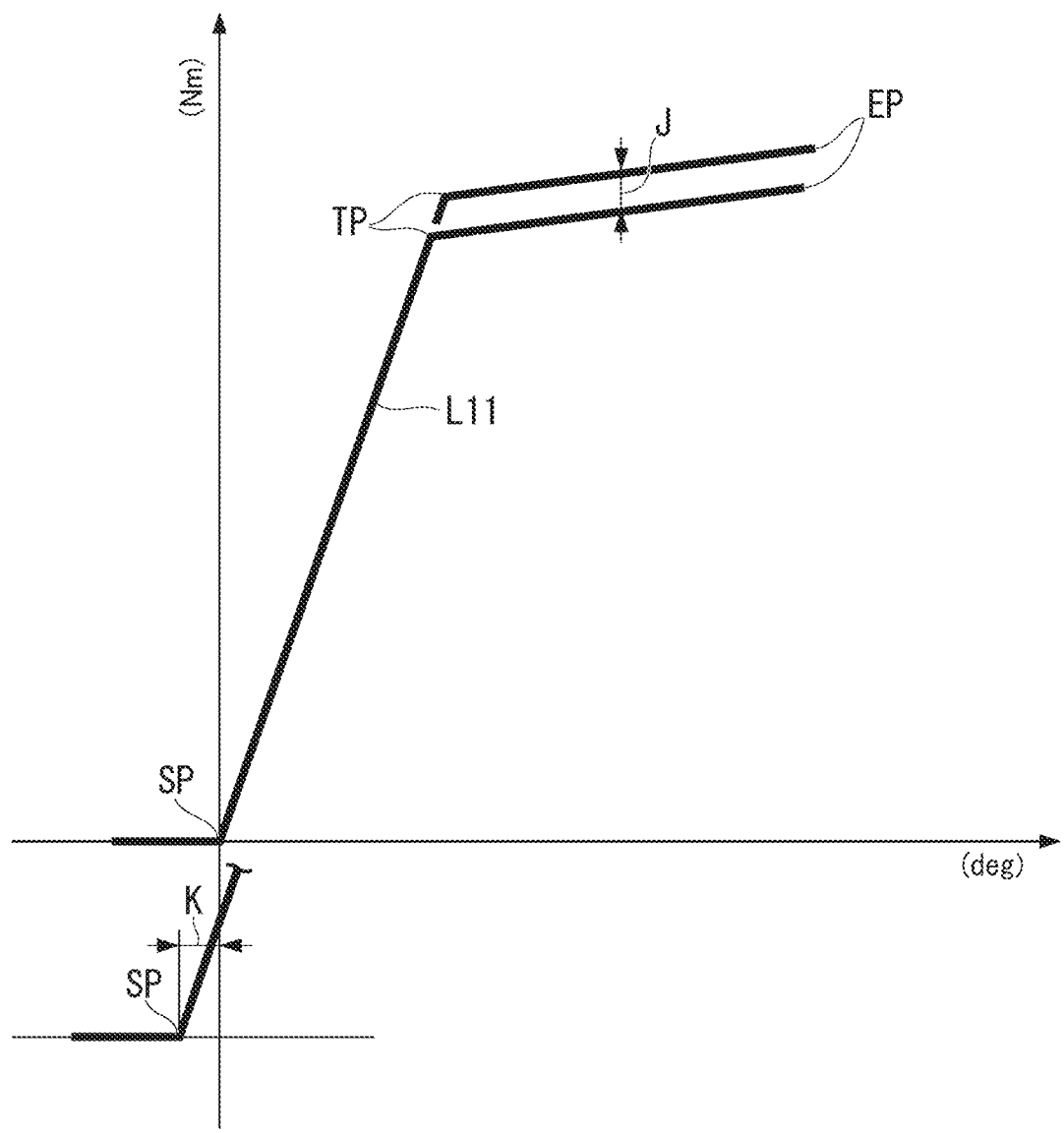
FIG. 14 is a graph corresponding to FIG. 12, showing a second action of the embodiment.

Next, a control of learning a current and an angle at the touch point TP or the like in the embodiment will be described with reference to the graph of FIG. 14. The graph in FIG. 14 shows a state in which the correlation line L11 indicating the clutch characteristics shown in FIGS. 12 and 13 changes according to wear of the clutch plate 35 and a temperature of the engine 13 (for example, a cooling water temperature). In FIG. 14, the vertical axis represents a release shaft torque (Nm), and the horizontal axis represents a release shaft operating angle (deg).

In the embodiment, for example, when a main switch (power supply) of the motorcycle 1 is turned off, a zero point (the operation start position SP and the touch point TP) during the clutch capacity control is corrected. In the current control of the motor 52, since a change in temperature affects the motor torque, a height of the correlation line L11 changes according to a temperature (see J in the drawing). Therefore, the zero-point correction is performed in each of a plurality of temperature ranges such as, for example, whether an engine temperature is 80 degrees or higher (or whether or not it is after engine warm-up). The zero point at this time is stored in a memory and used for a next clutch capacity control.

Also, at the same timing as described above, it is determined whether or not a decrease in the release shaft operating angle by more than a specified value has occurred. If the release shaft operating angle has significantly decreased, there is a likelihood that wear of the clutch plate 35 has occurred.

That is, in the normally closed clutch, when the clutch plate 35 is worn, the lifter shaft 39 moves to a side away from the release mechanism 38. Thereby, when the clutch plate 35 is worn, the play of the release mechanism 38 decreases. Thereby, the release shaft 53 operates the clutch device 26 to a disconnection side with a small operating angle. Thereby, the release shaft operating angle decreases at the operation start position SP at which the play region A switches to the half-clutch region B (see K in the drawing). Therefore, if the release shaft operating angle at the operation start position SP is reduced to a specified value or more, it is possible to predict that the clutch plate 35 is being worn. If wear of the clutch plate 35 is predicted (detected), it is possible to provide a warning to a user using an indicator 40c (see FIG. 3) provided in a meter device or the like.

The motor current and lever operating angle at the touch point TP or the like are learned every time the motorcycle 1 is powered off. Thereby, it is possible to perform the control using the touch point TP or the like with high accuracy, and also to predict (detect) wear of the clutch plate 35.

From a relationship between the lever operating angle and the motor current, the motor current and the lever operating angle at the touch point TP at which the clutch device 26 starts connection are learned. Thereby, it is possible to perform the clutch control on the basis of influences of friction, wear, and a temperature.

As described above, the clutch control device in the above-described embodiment includes the clutch device 26 connecting and disconnecting power transmission between the engine 13 and the transmission 21, the clutch actuator 50 outputting a driving force for operating the clutch device 26, a release mechanism 38 operating the clutch device 26 by receiving a driving force of the clutch actuator 50, the ECU 40 driving and controlling the clutch actuator 50, the current sensor 40b detecting an output value of the clutch actuator 50, and the rotation angle sensors 57d and 58d detecting an amount of operation of the release mechanism 38, in which the ECU 40 controls an operation of the clutch actuator 50 by selectively using detection information of the current sensor 40b and detection information of the rotation angle sensors 57d and 58d.

According to this configuration, a parameter used for control of the clutch device 26 can be switched to either the output value of the clutch actuator 50 or the amount of operation of the release mechanism 38 according to an operation state of the clutch device 26. For example, in a region such as the half-clutch region B in which a change in the output value of the clutch actuator 50 is large with respect to the amount of operation of the release mechanism 38, the output value of the clutch actuator 50 is used to control the operation of the clutch actuator 50. Also, in a region such as the clutch disconnection region C in which a change in the output value of the clutch actuator 50 is small with respect to the amount of operation of the release mechanism 38, the amount of operation of the release mechanism 38 is used to control the operation of the clutch actuator 50. As described above, the clutch actuator 50 can be appropriately controlled by suitably using the output value sensor and the operation amount sensor according to an operation state of the clutch device 26.

Also, in the clutch control device, the ECU 40 enables a manual operation intervention by the clutch operator during an automatic control of the clutch device 26 due to driving of the clutch actuator 50 and proceeds to the predetermined manual operation intervention control when there has been the manual operation intervention, and the ECU 40 detects the manual operation intervention by referring to detection information of the current sensor 40b and detection information of the rotation angle sensors 57d and 58d and performs the manual operation intervention control.

According to this configuration, a parameter detecting the manual operation intervention and used for the manual operation intervention control can be switched to either the output value of the clutch actuator 50 or the amount of operation of the release mechanism 38 according to an operation state of the clutch device 26. For example, in a region such as the half-clutch region B in which a change in the output value of the clutch actuator 50 is large with respect to the amount of operation of the release mechanism 38, the output value of the clutch actuator 50 and a position of the release mechanism are used to detect the manual operation intervention and perform the manual operation intervention control. Also, in a region such as the clutch disconnection region C in which a change in the output value of the clutch actuator 50 is small with respect to the amount of operation of the release mechanism 38, a change in a load of the motor 52 with respect to the amount of operation (angle, position) of the release mechanism 38 is used to detect the manual operation intervention and perform the manual operation intervention control. Thereby, the manual operation intervention can be appropriately performed according to a state of the clutch device 26.

Also, in the clutch control device, the ECU 40 switches between a control using detection information of the current sensor 40b and a control using detection information of the rotation angle sensors 57d and 58d at the touch point TP at which power transmission is started from a disconnected state in which power cannot be transmitted in the clutch device 26.

According to this configuration, in a region such as the half-clutch region B in which a change in the output value of the clutch actuator 50 is large with respect to the amount of operation of the release mechanism 38, the output value of the clutch actuator 50 is used to control the operation of the clutch actuator 50. Also, in a region such as the clutch disconnection region C in which a change in the output value of the clutch actuator 50 is small with respect to the amount of operation of the release mechanism 38, the amount of operation of the release mechanism 38 is used to control the operation of the clutch actuator 50. Thereby, the clutch actuator 50 can be appropriately controlled according to a state of the clutch device 26.

Also, in the clutch control device, the ECU 40 checks and updates the touch point TP when power is turned on or off.

According to this configuration, since the touch point TP is checked and updated frequently, the touch point TP is appropriately corrected even when there is an influence of an engine temperature, clutch wear, or the like. Thereby, the clutch actuator 50 can be appropriately controlled according to a state of the clutch device 26.

Also, the clutch control device described above includes the indicator 40c that notifies the user of the clutch control device that the touch point TP has exceeded a predetermined threshold value, and the ECU 40 operates the indicator 40c when the touch point TP exceeds the predetermined threshold value.

According to this configuration, if clutch wear increases or an abnormality occurs in the device, it is possible to quickly notify the user of it, thereby making it easier to maintain an appropriate control of the clutch device 26. For example, the indicator 40c is disposed on a meter or the like and can be visually checked by the user.

<Modified Example of Clutch Actuator>

Here, a modified example of the clutch actuator 50 will be described with reference to FIGS. 18 and 19.

Figure 18:
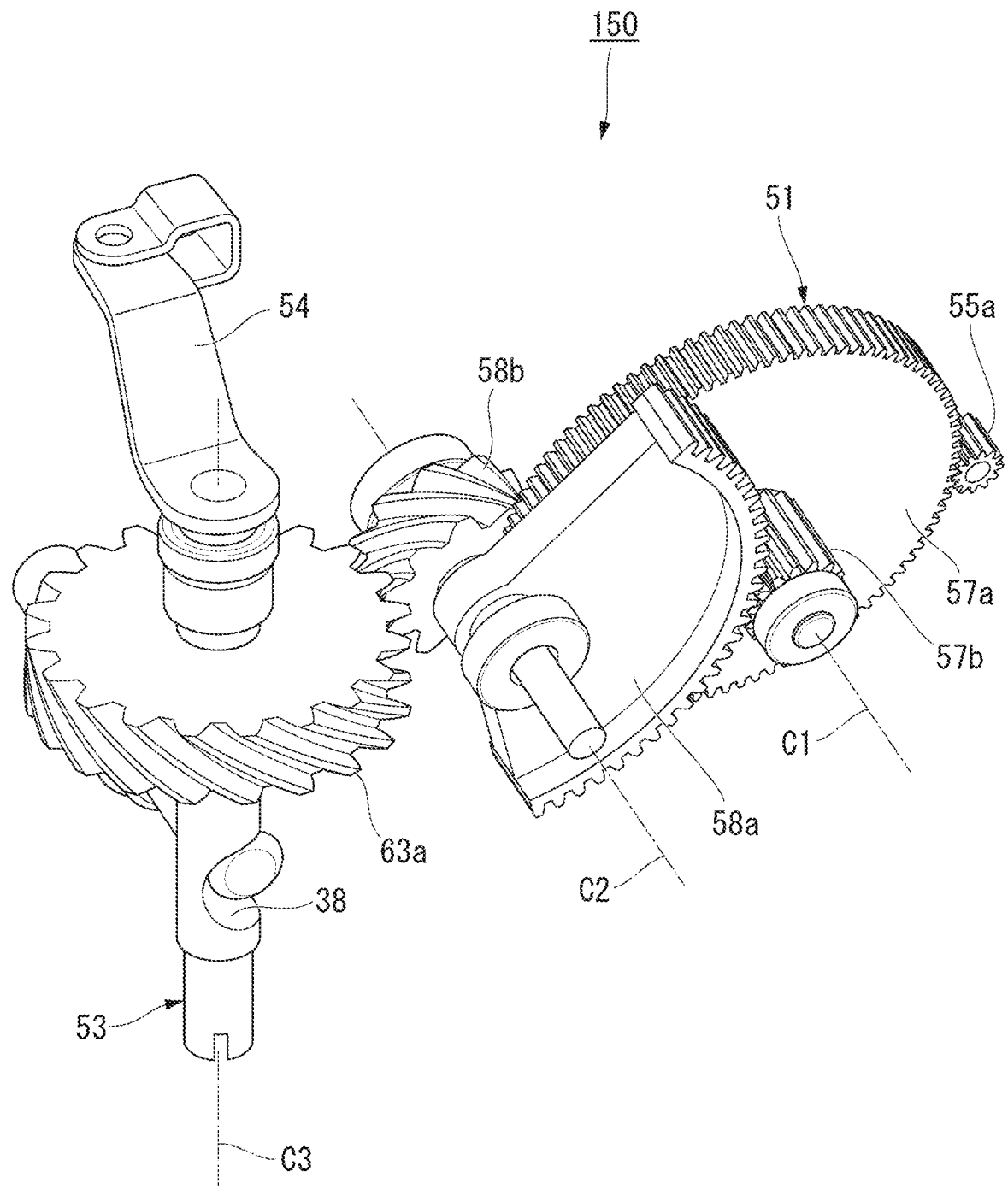
FIG. 18 is a perspective view illustrating a main part of a clutch actuator of a modified example of the embodiment.
Figure 19:
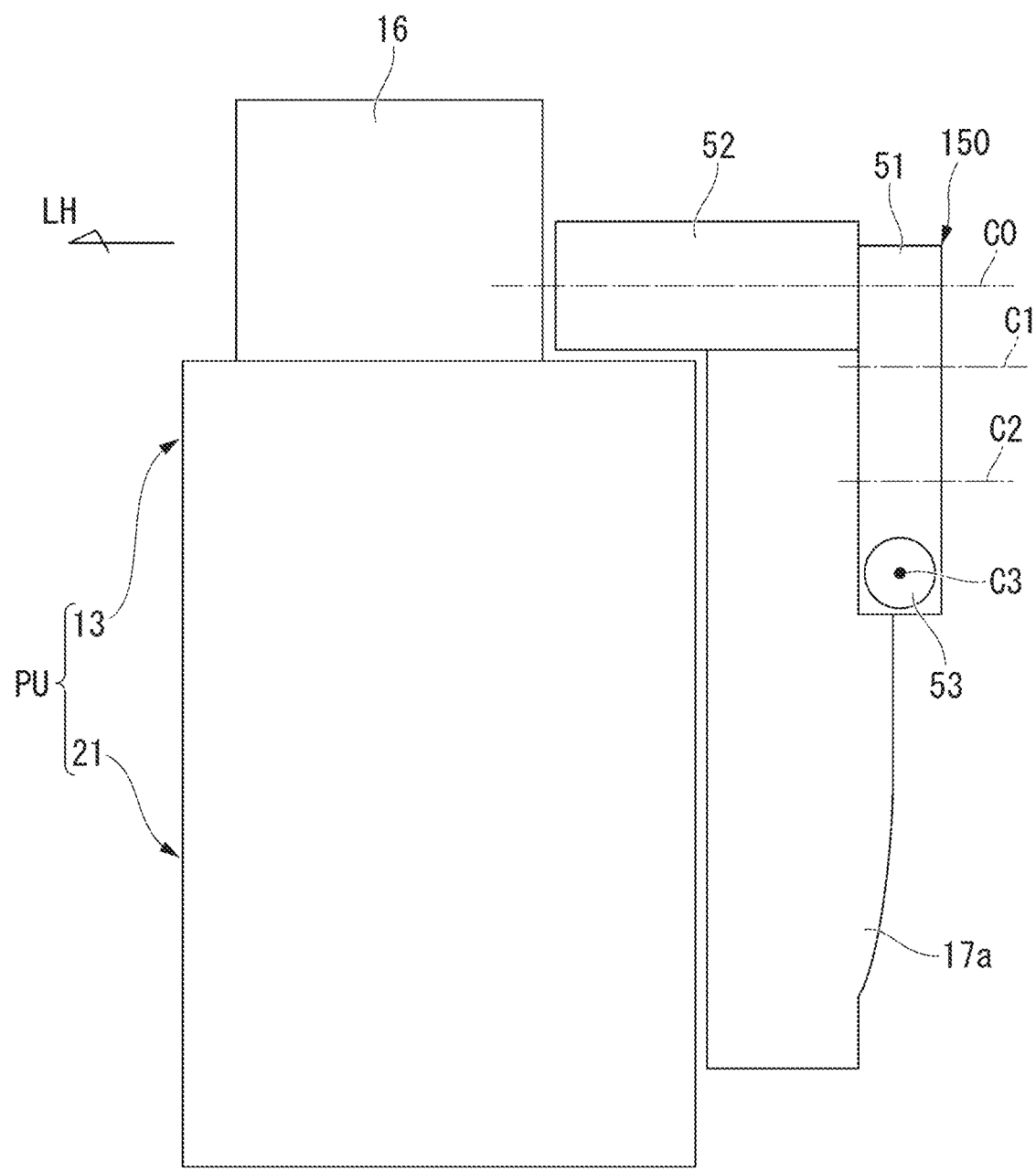
FIG. 19 is an explanatory view illustrating a state in which the clutch actuator of the modified example is mounted on a vehicle.

In the clutch actuator 50 of the above-described embodiment, each shaft of the motor 52 and the speed reduction mechanism 51 and the release shaft 53 are disposed with their axial directions parallel to each other, but in a clutch actuator 150 of the modified example shown in FIGS. 18 and 19, each shaft of the motor 52 and the speed reduction mechanism 51 and the release shaft 53 are disposed so that their axial directions are orthogonal to each other. In the modified example, a pair of gears that mesh with each other such as, for example, the second small diameter gear 58b and the driven gear 63a, are configured by gears (for example, screw gears, bevel gears, or the like) whose axial directions are orthogonal to each other.

In the clutch actuator 150 of the modified example, each shaft of the motor 52 and the speed reduction mechanism 51 and the release shaft 53 are disposed so that their axial directions are orthogonal to each other. Also, each shaft of the motor 52 and the speed reduction mechanism 51 and the clutch device 26 are disposed with their axial directions parallel to each other. Thereby, even when a large-diameter speed reduction gear is provided in the speed reduction mechanism 51 to increase a speed reduction ratio, particularly, the speed reduction mechanism 51 protruding outward in the vehicle width direction can be suppressed while keeping the speed reduction gear in a simple circular shape. Also, the motor 52 having a large axial dimension can be disposed to protrude in the vehicle width direction of the speed reduction mechanism 51 while avoiding the right cover 17a, the crankcase 15, and the like. That is, a disposition space of the motor 52 can be saved by utilizing a space on a lateral side or rear side of the cylinder 16, and thereby the clutch actuator 150 can be disposed efficiently. Thereby, an external appearance can be improved by reducing a size of the clutch unit in a vehicle side view, and an influence on a bank angle of the vehicle body can be reduced by reducing a volume of the clutch unit protruding from a side portion of the engine 13.

The present invention is not limited to the above-described embodiment, and for example, the clutch operator is not limited to the clutch lever, but may be a clutch pedal or other operators of various types. The clutch device is not limited to being disposed between the engine and the transmission, but may be disposed between the prime mover and any output target other than the transmission. The prime mover is not limited to an internal combustion engine, but may also be an electric motor.

The present invention is not limited to an application to a straddle-type vehicle in which a clutch operation is automated as in the above-described embodiment and is also applicable to a straddle-type vehicle having a so-called clutch-less transmission device which, while based on a manual clutch operation, enables gear shifting by adjusting a driving force without performing a manual clutch operation under predetermined conditions.

Also, the straddle-type vehicle described above includes general vehicles on which a driver straddles a vehicle body to ride, including not only motorcycles (including motorized bicycles and scooter type vehicles) but also three-wheeled vehicles (including vehicles with two front wheels and one rear wheel as well as vehicles with one front wheel and two rear wheels) or four-wheeled vehicles, and vehicles having an electric motor as a prime mover are also included therein.

The configuration in the above-described embodiment is an example of the present invention, and various changes can be made without departing from the gist of the present invention.

BRIEF DESCRIPTION OF THE REFERENCE SYMBOLS

1: Motorcycle (straddle-type vehicle)
13: Engine (prime mover)
21: Transmission (output target)
26: Clutch device
38: Release mechanism
40: ECU (control unit)
40A: Clutch control device
40b: Current sensor (first detection part)
40c: Indicator (notification means)
50, 150: Clutch actuator
57d, 58d: Rotation angle sensor (second detection part)
TP: Touch point (clutch connection point)

What is claim is:

1. A clutch control device comprising:
    a clutch device connecting and disconnecting power transmission between a prime mover and an output target;
    a clutch actuator outputting a driving force for operating the clutch device;
    a release mechanism operating the clutch device by receiving a driving force of the clutch actuator;
    a control unit driving and controlling the clutch actuator;
    a first detection part detecting an output value of the clutch actuator; and
    second detection parts detecting an amount of operation of the release mechanism, wherein
    the control unit controls an operation of the clutch actuator by selectively using detection information of the first detection part and detection information of the second detection parts.

2. The clutch control device according to claim 1, wherein
    the control unit enables a manual operation intervention by a clutch operator during an automatic control of the clutch device due to driving of the clutch actuator and proceeds to a predetermined manual operation intervention control when there has been the manual operation intervention, and
    the control unit detects the manual operation intervention by referring to detection information of the first detection part and detection information of the second detection parts and performs the manual operation intervention control.

3. The clutch control device according to claim 1, wherein the control unit switches between a control using detection information of the first detection part and a control using detection information of the second detection parts at a clutch connection point at which power transmission is started from a disconnected state in which power transmission is not possible in the clutch device.

4. The clutch control device according to claim 3, wherein the control unit checks and updates the clutch connection point when power is turned on or off.

5. The clutch control device according to claim 4, comprising a notification means notifying a user of the clutch control device that the clutch connection point has exceeded a predetermined threshold value, wherein
    the control unit operates the notification means when the clutch connection point exceeds the predetermined threshold value.

6. The clutch control device according to claim 3, comprising a notification means notifying a user of the clutch control device that the clutch connection point has exceeded a predetermined threshold value, wherein
    the control unit operates the notification means when the clutch connection point exceeds the predetermined threshold value.

* * * * *